US011000930B1

(12) United States Patent
Partington

(10) Patent No.: US 11,000,930 B1
(45) Date of Patent: May 11, 2021

(54) ADVANCED JIG FOR MANUFACTURING OF FIREARM LOWER RECEIVER

(71) Applicant: BlackHawk Manufacturing Group Inc., Garden Grove, CA (US)

(72) Inventor: Wayne R. Partington, Sterling, MA (US)

(73) Assignee: BlackHawk Manufacturing Group Inc., Garden Grove, CA (US)

( * ) Notice: Subject to any disclaimer, the term of this patent is extended or adjusted under 35 U.S.C. 154(b) by 78 days.

(21) Appl. No.: 16/190,014

(22) Filed: Nov. 13, 2018

Related U.S. Application Data

(60) Provisional application No. 62/584,719, filed on Nov. 10, 2017.

(51) Int. Cl.
*B23Q 17/22* (2006.01)
*F41A 3/66* (2006.01)

(52) U.S. Cl.
CPC ............ *B23Q 17/2233* (2013.01); *F41A 3/66* (2013.01)

(58) Field of Classification Search
CPC ..... B23Q 17/2233; B23Q 3/062; B23P 13/02; F41A 3/66
USPC .................................... 33/638, 566
See application file for complete search history.

(56) References Cited

U.S. PATENT DOCUMENTS

| | | |
|---|---|---|
| 362,044 A | 4/1887 | Strange |
| 1,476,019 A | 12/1923 | William |
| 2,273,954 A | 2/1942 | Grass |
| 2,363,085 A | 11/1944 | Roye |
| 2,393,424 A | 1/1946 | Selch |
| 2,455,644 A | 12/1948 | Barnes |
| 2,482,535 A | 9/1949 | Bayless |
| D160,734 S | 10/1950 | Polkosnik |

(Continued)

FOREIGN PATENT DOCUMENTS

| | | |
|---|---|---|
| CA | 1137338 A | 12/1982 |
| EP | 0055307 A1 | 7/1982 |

(Continued)

OTHER PUBLICATIONS

80 Percent Arms Inc., "AR-15 Easy Jig® Manual," dated 2016, 20 pages.

(Continued)

*Primary Examiner* — Christopher W Fulton
(74) *Attorney, Agent, or Firm* — Knobbe, Martens, Olson & Bear, LLP

(57) ABSTRACT

An advanced jig for manufacturing a firearm lower receiver can include an adapter, a guide plate, a front support, a buffer support, a buffer mounting screw and at least one carriage with at least one locating pin. A guide plate can be in a location above the fire control cavity of a lower receiver and can be mounted to the carriage(s) in conjunction with a rotary power tool adapter. The jig can be a universal fitment. The jig can include a bearing to support a rotary tool and can be constructed and arranged to provide for use of at least one guiding feature to facilitate in the guidance of the rotary tool without placing the rotary tool in direct contact with any of a plurality of guidance features for firearm lower receiver manufacturing. A removable locating pin can be situated in a location along the front takedown pin hole of a firearm receiver that is for firearm lower receiver manufacturing.

8 Claims, 42 Drawing Sheets

(56) References Cited

U.S. PATENT DOCUMENTS

| | | | |
|---|---|---|---|
| 2,538,173 A | 1/1951 | Swebilius |
| 2,543,917 A | 3/1951 | Lloyd |
| 2,601,809 A | 7/1952 | Di Nardo |
| 2,859,645 A | 11/1958 | Emmons et al. |
| 2,896,677 A | 7/1959 | Payzant |
| 3,108,500 A | 10/1963 | Merriman |
| 3,141,509 A | 7/1964 | Bent |
| 3,149,534 A | 9/1964 | Stephens |
| 3,211,026 A | 10/1965 | Calahan |
| 3,358,375 A | 12/1967 | Lutz |
| 3,396,613 A | 8/1968 | Hutton |
| 3,494,229 A | 2/1970 | Judge |
| 3,555,964 A | 1/1971 | Fleming |
| 3,785,634 A | 1/1974 | Denker |
| 3,788,632 A | 1/1974 | Lukas |
| 3,789,892 A | 2/1974 | Converse et al. |
| 3,799,687 A | 3/1974 | Anderson |
| 3,811,163 A | 5/1974 | Frederick et al. |
| 3,984,192 A | 10/1976 | Wanner et al. |
| 4,145,160 A | 3/1979 | Wiggins |
| 4,155,383 A | 5/1979 | Welliver |
| 4,209,275 A | 6/1980 | Kim |
| 4,330,229 A | 5/1982 | Croydon |
| 4,448,406 A | 5/1984 | Hallberg |
| 4,475,437 A | 10/1984 | Sullivan |
| 4,484,608 A | 11/1984 | Ferdinand |
| 4,502,367 A | 3/1985 | Sullivan |
| 4,505,182 A | 3/1985 | Sullivan |
| 4,536,107 A | 8/1985 | Sandy et al. |
| 4,610,581 A | 9/1986 | Heinlein |
| 4,630,656 A | 12/1986 | Collins |
| 4,648,761 A | 3/1987 | Mitchell et al. |
| D291,529 S | 8/1987 | Degen |
| 4,735,007 A | 4/1988 | Gal |
| 4,738,574 A | 4/1988 | Emmert |
| 4,813,125 A | 3/1989 | Dacey, Jr. |
| 4,859,824 A | 8/1989 | Ukaji |
| 4,936,721 A | 6/1990 | Meyer |
| 4,948,306 A | 8/1990 | Wiedner et al. |
| 4,966,507 A | 10/1990 | Hanks |
| 5,017,056 A * | 5/1991 | Morash ................ B23B 47/28 33/638 |
| 5,059,059 A | 10/1991 | Cox |
| 5,102,271 A | 4/1992 | Hemmings |
| 5,123,463 A | 6/1992 | Grisley |
| 5,141,369 A | 8/1992 | Palace |
| 5,165,827 A | 11/1992 | Miller |
| 5,209,614 A | 5/1993 | Matthews |
| 5,311,654 A | 5/1994 | Cook |
| 5,358,364 A | 10/1994 | Kall |
| 5,378,091 A | 1/1995 | Nakamura |
| 5,492,160 A | 2/1996 | McCracken |
| 5,560,408 A | 10/1996 | DiFranco |
| 5,694,994 A | 12/1997 | Engler, III |
| 5,725,038 A | 3/1998 | Tucker |
| 5,967,712 A | 10/1999 | Magill et al. |
| 6,065,909 A | 5/2000 | Cook |
| 6,070,352 A | 6/2000 | Daigle |
| 6,158,487 A | 12/2000 | Licari |
| 6,394,466 B1 | 5/2002 | Matsumoto et al. |
| 6,481,937 B1 | 11/2002 | Sommerfeld et al. |
| 6,520,224 B2 * | 2/2003 | Smith ................ B27C 5/02 144/135.2 |
| 6,557,730 B1 | 5/2003 | Kaye |
| 6,712,104 B1 | 3/2004 | Latshaw |
| 6,742,558 B1 | 6/2004 | Witt |
| 6,792,711 B2 | 9/2004 | Battaglia |
| 6,796,050 B2 | 9/2004 | Haimer et al. |
| 6,813,843 B1 | 11/2004 | Faubion |
| D528,930 S | 9/2006 | Degen |
| 7,108,463 B2 | 9/2006 | Hummel |
| 7,225,539 B2 | 6/2007 | Nowak et al. |
| 7,231,861 B1 | 6/2007 | Gauny et al. |
| 7,269,901 B2 | 9/2007 | Robin |
| 7,367,763 B2 | 5/2008 | Ruy Frota de Souza |
| D571,233 S | 6/2008 | Rys, Jr. |
| 7,588,400 B2 | 9/2009 | Taylor |
| 7,641,425 B2 | 1/2010 | Sommerfeld et al. |
| 7,819,146 B2 | 10/2010 | McDaniel |
| 7,857,020 B2 | 12/2010 | McDaniel |
| 7,871,224 B2 | 1/2011 | Dost et al. |
| 8,052,355 B2 | 11/2011 | Hirukawa et al. |
| 8,241,297 B2 | 8/2012 | Ashman |
| 8,327,749 B2 | 12/2012 | Underwood |
| 8,573,906 B2 | 11/2013 | Gowker |
| 8,584,372 B2 | 11/2013 | Stoffel |
| 8,656,622 B2 | 2/2014 | Peterson et al. |
| 8,683,725 B2 | 4/2014 | Munson |
| 9,009,986 B1 * | 4/2015 | Chang ................ B23P 13/00 33/640 |
| 9,259,851 B2 | 2/2016 | Cardew |
| 9,662,717 B2 | 5/2017 | Prom et al. |
| 9,802,332 B2 | 10/2017 | Davey |
| 9,810,517 B2 | 11/2017 | Chang et al. |
| D804,926 S | 12/2017 | Atkinson |
| 9,982,958 B1 * | 5/2018 | Partington ................ F41A 3/66 |
| D824,741 S | 8/2018 | Davis |
| 10,099,329 B1 * | 10/2018 | Smith ................ B23Q 3/062 |
| 10,145,633 B1 | 12/2018 | Partington |
| D847,935 S | 5/2019 | Smith |
| 10,391,591 B2 * | 8/2019 | Smith ................ B23P 13/02 |
| 10,456,846 B1 * | 10/2019 | Partington ................ B23C 5/26 |
| 10,718,578 B2 | 7/2020 | Partington |
| 2001/0011564 A1 | 8/2001 | Darling |
| 2002/0021945 A1 | 2/2002 | Harpaz et al. |
| 2004/0065387 A1 | 4/2004 | Smith |
| 2004/0179906 A1 | 9/2004 | Hughes et al. |
| 2005/0025588 A1 | 2/2005 | Effrem |
| 2005/0086788 A1 | 4/2005 | Wasileski et al. |
| 2005/0120573 A1 | 6/2005 | Port |
| 2009/0065095 A1 | 3/2009 | McDaniel |
| 2010/0074701 A1 | 3/2010 | Kempen et al. |
| 2010/0303568 A1 | 12/2010 | York |
| 2011/0280676 A1 | 11/2011 | Nordlin |
| 2012/0005937 A1 | 1/2012 | Milino |
| 2013/0028675 A1 | 1/2013 | Vogler et al. |
| 2015/0027587 A1 | 1/2015 | Smith |
| 2015/0040414 A1 | 2/2015 | Nakamura et al. |
| 2015/0128396 A1 | 5/2015 | Motomura |
| 2017/0209941 A1 * | 7/2017 | Chang ................ B23B 47/28 |
| 2018/0058835 A1 | 3/2018 | Chang et al. |
| 2019/0039192 A1 | 2/2019 | Smith |
| 2019/0210170 A1 | 7/2019 | Smith |
| 2019/0331442 A1 | 10/2019 | Partington |
| 2020/0206832 A1 | 7/2020 | Smith |

FOREIGN PATENT DOCUMENTS

| | | |
|---|---|---|
| FR | 1075194 A | 10/1954 |
| GB | 1008029 A | 10/1965 |
| GB | 2514491 A | 11/2014 |

OTHER PUBLICATIONS

5D Tactical LLC, A New Dimension in Firearms, "AR-15 & AR-308 Router Jig Instructions," dated as created Dec. 14, 2016 (as indicated by the PDF file metadata), 11 pages.

Modulus Arms, "Universal AR-15 80% Lower Receiver Jig Instructions," dated Mar. 25, 2015, 19 pages.

Modulus Arms, "AR-308/AR-10 Jig Instructions," dated Oct. 20, 2014, 24 pages.

Kreg Tool, Quick-Start Guide, Jig Product Manual, dated 2010, 27 pages.

Kreg Newsletter, "4 Tips for Tight-Fitting Kreg Joints," available at <http://www.kregtool.com/files/newsletters/kregplus/may13.html>, dated Aug. 2013, 4 pages.

DIYdiva, "Joinery 101: Using a Kreg Jig," available at <http://diydiva.net/2011/07/joinery-101-using-a-kreg-jig/>, dated Jul. 18, 2011.

Modulus Arms, "Heavy-Duty Universal AR-15 80% Lower Receiver Jig Instructions," dated Jan. 14, 2016, 21 pages.

(56) References Cited

OTHER PUBLICATIONS

Iconic Industries Inc., "Legacy Instructions for Iconic Brand Jigs," <https://www.iconicindustriesinc.com/finishing-fixturesjigs>, for purposes of examination, consider published before Apr. 18, 2017, pp. 3-25.
80 Percent Arms Inc., "Easy Jig® Gen 2 Multi-Platform Milling System User Manual" dated 2017, 15 pages.

* cited by examiner

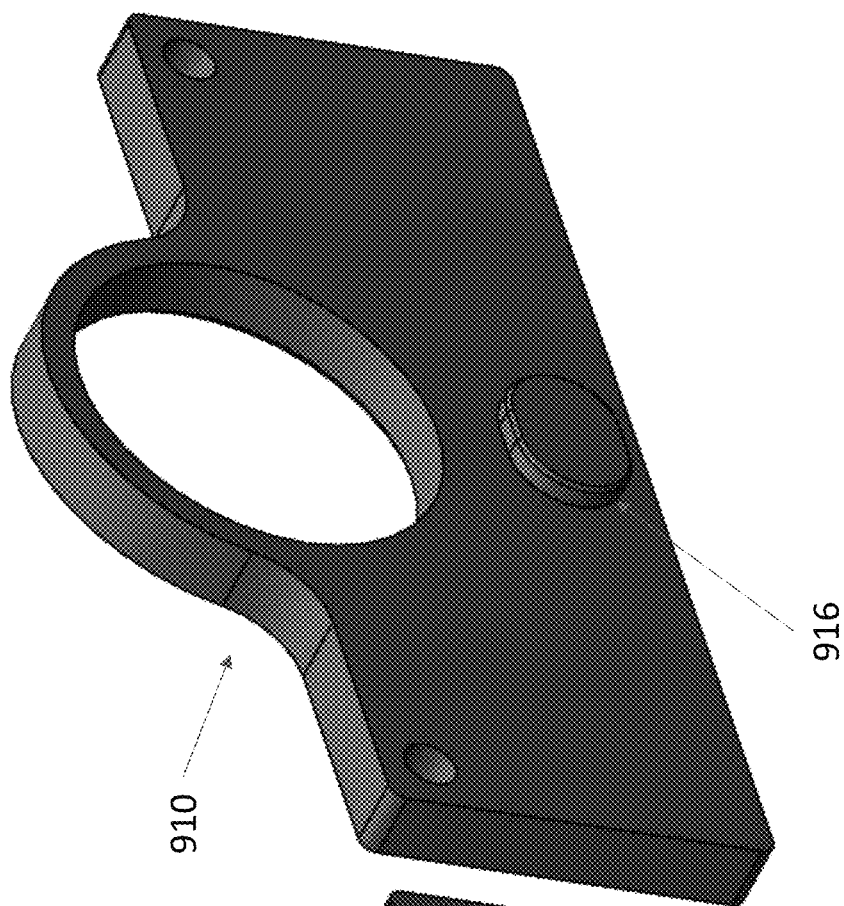
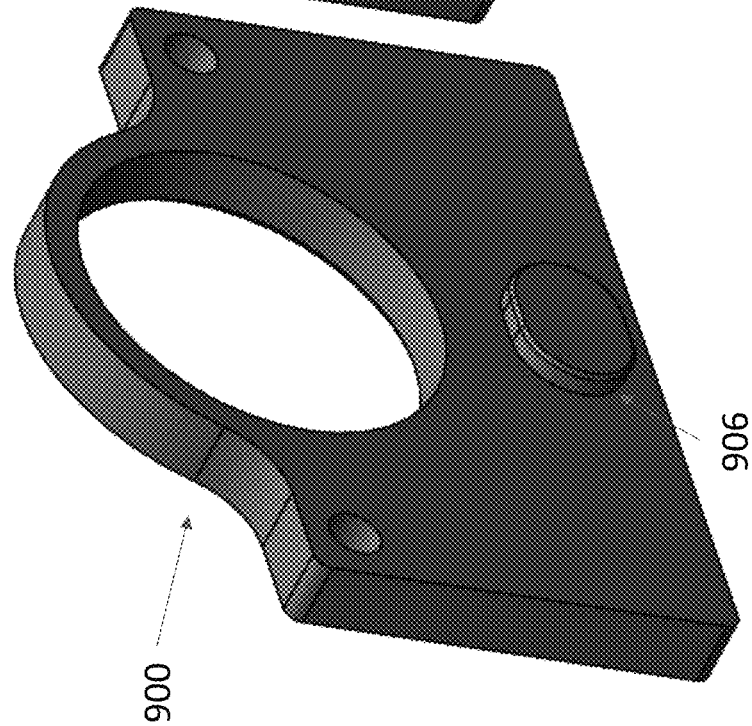
Fig. 11A
Fig. 11B

| Router Model | Install Method | ReadyMILL Model |
|---|---|---|
| Bosch PR10E^x | 2 | A |
| Bosch PR20EV^x | 2 | A |
| Bosch 1617EV | 3* | D |
| Bosch 1617EVS | 3* | D |
| Craftsman 28212^Y | 1 | B |
| Craftsman 2767 | 3* | D |
| Craftsman 27683 | 3* | D |
| Craftsman 50429 | 3* | D |
| DeWalt DWE6000 | 2 | A |
| DeWalt DWP611^Z | 1 | B |
| DeWalt DW616 | 3* | D |
| DeWalt DW618 | 3* | D |
| Hitachi M12VC | 3* | D |
| Makita RT0701C | 2 | C |
| Porter Cable 450 | 1 | B |
| Porter Cable 6430 | 2 | A |
| Porter Cable 6435 | 2 | A |
| Rigid R24012 | 2 | A |

Fig. 32A

ADVANCED JIG FOR MANUFACTURING OF FIREARM LOWER RECEIVER

RELATED APPLICATIONS

This application claims the benefit of U.S. Provisional Application Ser. No. 62/584,719, filed Nov. 10, 2017, entitled ADVANCED JIG FOR MANUFACTURING OF FIREARM LOWER RECEIVER, the entire disclosure of which is herein incorporated by referenced.

FIELD OF THE INVENTION

This invention relates to systems and methods for manufacturing an 80% (partially unfinished) firearm receiver, with a high rate of success with improved quality, by an unskilled user.

BACKGROUND OF THE INVENTION

A market exists for incompletely/partially manufactured firearm lower receivers. A firearm lower receiver is unregulated until a minimum level of manufacturing is completed. This level is typically known as "80%". Firearm lower receivers completed to this level are typically referred to as "80%" lower receiver. These firearm lower receivers must then be completed by the end user to be operable. In a typical configuration the unfinished lower receiver is molded, cast, billet and/or forged and is partially machined, with certain aspects of the inner slot (in which the trigger mechanism resides) remaining uncut. The finishing task cuts this remaining slow with appropriate dimensions and accuracy.

The completion of these lower receivers can be time consuming and quality results may be difficult to achieve with prior art. In accordance with the prior art, the technique for finishing the receiver can employ complex and ineffective systems to adapt the jig assembly to various types of lower receivers. Additionally, the prior art technique can involve the use of an inadequately supported rotating tool which can produce poor results and excessive breakage.

It would be desirable to provide a device and method that can make finishing a lower receiver easier to do with high quality results and reduced breakage.

SUMMARY OF THE INVENTION

This invention overcomes the disadvantages of the prior art by providing a jig assembly that can simply and effectively be adapted to various 80% lower receivers and that adequately supports the rotating tool. The device described herein can aid a user to finish a lower receiver easily, with high-quality results, and without breakage. This device reduces the overall number of parts required to adapt the jig to various lower receivers by utilizing similar features and dimensions across multiple platforms and adapting the useful areas of the jig to locate to them.

An advanced jig for manufacturing a firearm lower receiver can be comprised of an adapter; a guide plate with plate screws; a front support; a buffer support; a buffer locator and at least one carriage with at least one locating pin. A guide plate can be in a location above the fire control cavity of a lower receiver and can be mounted to the carriage(s) in conjunction with a rotary power tool adapter. The jig can be a universal fitment. The jig can include a bearing to support a rotary tool and can be constructed and arranged to provide for use of at least one guiding feature to facilitate in the guidance of the rotary tool without placing the rotary tool in direct contact with any of a plurality of guidance features for firearm lower receiver manufacturing. A removable locating pin can be situated in a location along the front takedown pin hole of a firearm receiver that is for firearm lower receiver manufacturing.

BRIEF DESCRIPTION OF THE DRAWINGS

The invention description below refers to the accompanying drawings, of which:

FIG. 11A is a perspective view of the AR15 buffer support, according to the illustrative embodiment;

FIG. 11B is a perspective view of the AR10 buffer support, according to the illustrative embodiment;

FIG. 32A depicts a step in a method router adapter installation according to one or more aspects of the disclosure;

DETAILED DESCRIPTION

Figure 1:
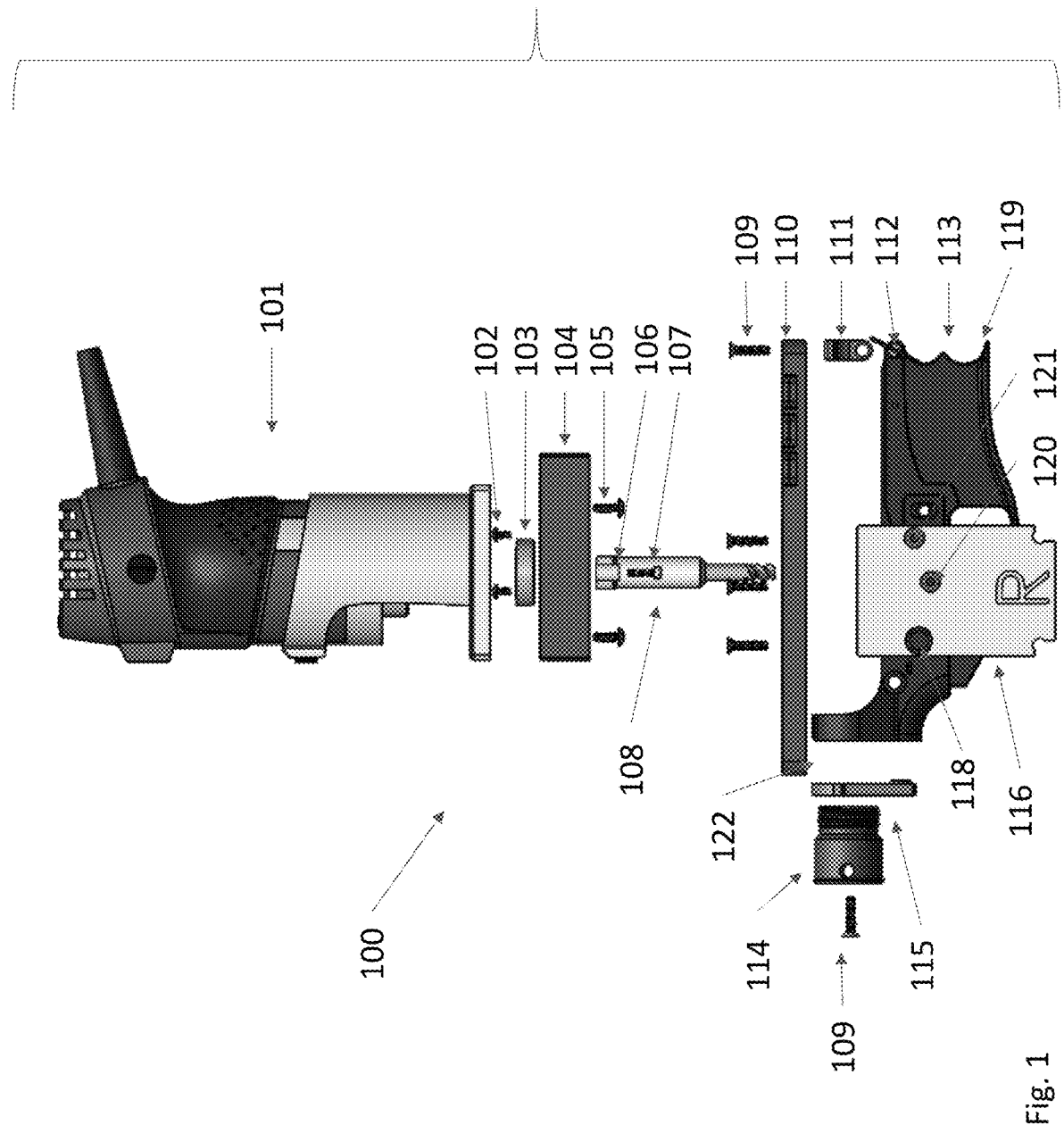
FIG. 1 is an exploded right side view of a firearm lower receiver, an advanced jig, a rotary tool, and a rotary power tool, according to an illustrative embodiment.

FIG. 1 is an exploded right side view of a firearm lower receive, an advanced jig, a rotary tool, and a rotary power tool, according to an illustrative embodiment. A jig can provide repeatability, accuracy, and interchangeability in the manufacturing of products. The advanced jig 100 shown in FIG. 1 can guide a user in finishing a lower receiver easily, accurately, and without breakage. An advanced jig 100 can be assembled around a lower receiver 113 to aid a user in finishing the lower receiver 113. In the illustrative embodiment shown in FIG. 1, the lower receiver 113 can be an AR15 lower receiver. The lower receiver shown in FIG. 1 is a form of popular AR-style receivers (including, for example, the AR-15, M-16, M-4 carbine, and variants thereof), however, it should be clear that the system and method described herein can be used with a variety of other lower receivers in addition to the AR15 shown in the illustrative example in FIG. 1. The lower receiver is the portion of the firearm that includes a buffer mount, pistol grip mount, trigger mechanism and magazine well. The upper receiver contains the barrel, chamber and bolt assembly. The lower receiver can be attached to the upper receiver by two takedown pins. The firearm can be available in fully automatic and semi-automatic versions and in various calibers including; approximately 0.223 inch, approximately 0.300 inch, approximately 0.308 inch, approximately 0.500 inch, approximately 9 mm, approximately 6.5 mm and approximately 7.62 mm.

The lower receivers for an AR15 or other firearms have holds and other structures that are consistently located reliably and accurately by the manufacturer using sophisticated tooling, so the holes and other structures of a lower receiver can be relied upon to engage the jig assembly consistently and accurately. A user can utilize these holes and structures in mounting and assembling an advanced jig around the lower receiver. Relying on the holes and structures inherent to the lower receiver can allow the jig to be accurately and repeatably mounted to the lower receiver, and the corresponding cutting performed by the user can be equally reliable and accurate. As described herein, the lower receiver 113 includes a buffer mount 122 for receiving a buffer assembly within the shoulder stock at the rear end of the lower receiver 113. The lower receiver 113 includes a front surface of the magazine well 119 at the front end of the lower receiver. As presented in FIG. 1, the rear end of the lower receiver 113 is on the left side and the front end of the lower receiver 113 is on the right side and the visible face of the lower receiver is the "right" side. Thus, the relative orientation of the jig assembly 100 (i.e. left, right, front, rear, top and bottom) is described with respect to the corresponding, confronting sides of the lower receiver 113 for the purpose of clarity and ease of description.

An advanced jig 100 can be an assembly that can include a guide plate 110, a front support 111, a buffer support 115, a buffer locator 114, an adapter 104, at least one carriage plate 116, plate screws 109, and at least one locating pin 112. The buffer support 115 and front support 111 can be adapted to a particular lower receiver. In the illustrative example shown in FIG. 1, the lower receiver is for an AR15, and the buffer support and front support are accordingly, adapted for use with an AR15. However, although the illustrative example of FIG. 1 shows an AR15 lower receiver and a front support 111 and buffer support 115 adapted for use with an AR15 lower receiver, it should be clear that the jig of the present disclosure can be used for finishing various other firearm lower receivers, and various buffer supports and front supports adapted for use in finishing various other firearm lower receivers can be used. In an embodiment, the jig assembly can be provided as a kit with appropriate instructions (printed, on electronic media and/or available via the Internet). See for example, the instructions in attached Appendix A, which describe setup and use of the jig assembly.

The advanced jig 100 can be a universal fitment. The advanced jig 100 can be assembled onto the lower receiver by placing a front support 111 between the standard mounting ears (shown in FIG. 7) on the lower receiver and passing locating pin 112 through the lower receiver 113 and through the front support 111 to secure the front support 111 to the lower receiver 113. Guide plate 110 can be attached to the front support 111 with screws 109. As described below, the plate screws 109 can be machine screws with an appropriate diameter, thread size and length. In various embodiments, front support 111 could be part of guide plate 110 rather than a separate piece.

Buffer support 115 can be placed against the buffer end of the lower receiver 113, and the buffer locator 114 can be inserted through buffer support 115 and threaded into the lower receiver 113 to secure buffer support 115 to the lower receiver 113. Lower receiver 113 includes buffer threads (shown in FIG. 16), and buffer locator 114 can be threaded into the buffer threads. Buffer support 115 can be adapted for use with the specific type of lower receiver being finished, such as the AR15 lower receiver shown in the illustrative embodiment of FIG. 1. Buffer support 115 can be attached to guide plate 110 with plate screws 109. Plate screws 109 can be machine screws (for example, a #8-32 flat head machine screw), sheet metal screws, or another form of the self-tapping screws. In various embodiments, buffer support 115 could be part of guide plate 110 rather than a separate piece. The plate screws 109 can be tightened to secure the guide plate 110, front support 111, and buffer support 115 together.

The advanced jig 100 can be further assembled around a lower receiver 113 by placing a left carriage plate (shown in FIG. 3) on the left side of a lower receiver 113 and by placing a right carriage plate 116, on the right side of the lower receiver 113. Plate screws 109 can be used to secure the right carriage plate 116 and the left carriage plate to the guide plate 110. Plate screws 109 can be tightened to secure the carriage plates and the guide plate 110 together. In various embodiments, only one carriage plate may be used. The buffer locator 114 can be tightened into the receiver 113 to secure the receiver 113 and the guide plate 110, front support 111, buffer support 115, and at least one carriage plate 116 together. The buffer locator 114 can be tightened into the receiver 113 by passing a screwdriver or other lever through holes in the sidewalls of the buffer locator 114, and twisting the buffer locator 114 in a clockwise direction. The buffer locator 114 can have wrench flats for tightening to receiver 113.

Carriage plate 116 can be provided with drill guiding holes 118, 120, and 121 along the side of carriage plate 116. Drill guiding holes 118, 120, and 121 can be used to guide the drilling of appropriate holes in the appropriate locations into the lower receiver 113. These guide holes can be used to guide and align a drill bit to bore desired holes into the side of the lower receiver 113. By way of non-limiting example drill guide hole 121 can be a guide hole for drilling a hammer pivot/pin hole. The hammer pivot/pin hole can be used for the subsequent mounting of an assembly that retains the hammer mechanism within the lower receiver. Drill guide hole 120 can be a guide hole for drilling a trigger pivot/pin hole. The trigger pivot/pin hole can be used for the later mounting of a trigger pivot/pin to retain the trigger mechanism. Drill guide hole 118 can be a guide hole for drilling a selector/safety pivot hole. The selector/safety pin hole can be used for the subsequent mounting of a selector/safety lever. These carriage guide holes can provide for the accurate and precise placement of the pin holes and are constructed so that an unskilled user can properly drill the pivot/pin holes in the correct place for completion of the assembly of a functioning lower receiver. In various embodiments, holes can be provided on each of opposing carriage plates to drill each side of the receiver, or holes can be provided on one side and the drill can pass through both sides of the receiver. The thickness of the carriage plate(s) and close tolerance of the hole to the drill shaft can be sufficient to ensure minimal skew or wobble as the drill passes into the lower receiver side.

The rotary power tool 101 can receive and retain an appropriately sized and shaped rotary tool 108, as described further below. Rotary tool 108 can be attached to the collet of rotary power tool 101, so that rotary tool 108 can be used in finishing the lower receiver 113. The rotary power tool 101 retains an appropriate rotary tool 108 that can vary in accordance with various embodiments and various lower receivers. The term "rotary tool" shall be taken broadly herein to mean any one of a variety of rotating cutting elements that can be mounted removably (or permanently) within or around a chuck or arbor of the rotary power tool 101. The rotary tool 108 could also engage to the collet via a threaded feature. For example, a two-flute, three-flute, four-flute, five-flute, six-flute, seven-flute or eight or more flute rotary tool of appropriate diameter (for example, approximately ⅛ inch, approximately 3/16 inch, approximately ¼ inch, approximately 5/16 inch, approximately ⅜ inch, approximately 7/16 inch, approximately ½ inch, approximately 9/16 inch, or another appropriate diameter larger than ⅛ inch) can be mounted within the rotary power tool. In various embodiments, a separate device can be engaged with the rotary power tool, and the separate device can retain a rotary tool. Note that a wide variety of rotary power tools can be employed in association with an embodiment of the jig assembly—for example a router, drill, hand piece of a flexible-shaft unit or Dremel®-style tool. The rotary tool can be cordless or powered by (e.g.) wall current via a power cable.

Adapter 104 can be attached to the rotary power tool 101 with adapter screws 105. Adapter screws 105 can be of a shape, size, thread pitch, and length to adequately engage with rotary power tool 101, and can vary with different rotary power tools. Various thread designations can be used for various rotary power tools. By way of non-limiting example, rotary power tool 101 can be threaded with M4×0.7 threads.

Adapter 104 can include a bearing 103. Bearing 103 can be various sizes and shapes. Bearing 103 can have an inner diameter that can be greater than ¼ inch. Bearing 103 can have an inner diameter of approximately ⅛ inch, approximately 3/16 inch, approximately ¼ inch, approximately 5/16 inch, approximately ⅜ inch, approximately 7/16 inch, approximately ½ inch, approximately 9/16 inch, approximately ¾ inch, approximately 13/16 inch, approximately ⅞ inch, approximately 15/16 inch, approximately 1 inch, approximately 4 mm, approximately 5 mm, approximately 6 mm, approximately 7 mm, approximately 8 mm, approximately 9 mm, approximately 10 mm, approximately 11 mm, approximately 12 mm, approximately 13 mm, approximately 14 mm, approximately 15 mm, approximately 16 mm, approximately 17 mm, approximately 18 mm, approximately 19 mm, approximately 20 mm, approximately 21 mm, approximately 22 mm, approximately 23 mm, approximately 24 mm, approximately 25 mm, and others. For purposes of this patent, approximately means plus or minus ⅛ inch of the specified dimension. Bearing 103 can be engaged with adapter 104 with bearing screws 102. In various embodiments, bearing 103 can be engaged with adapter 104 in a variety of mechanical and chemical ways including; thermal fit, press fit, epoxy, adhesive and other methods. Bearing 103 can be engaged with adapter 104 by one or more screws by attaching a secondary piece over the bearing and clamping the bearing in position.

Adapter 104 can engage with guide pins 106. In an embodiment, guide pins 106 can be attached to adapter 104 with guide pin screws 107. In various embodiments, guide pins 106 can be part of adapter 104. In various embodiments, guide pins 106 can be mechanical or chemically fastened to adapter 104. In various embodiments, a single guide pin 106 can be used. The adapter 104 with guide pins 106 can be placed atop guide plate 110 to aid in the guidance of rotary power tool 101.

Figure 2:
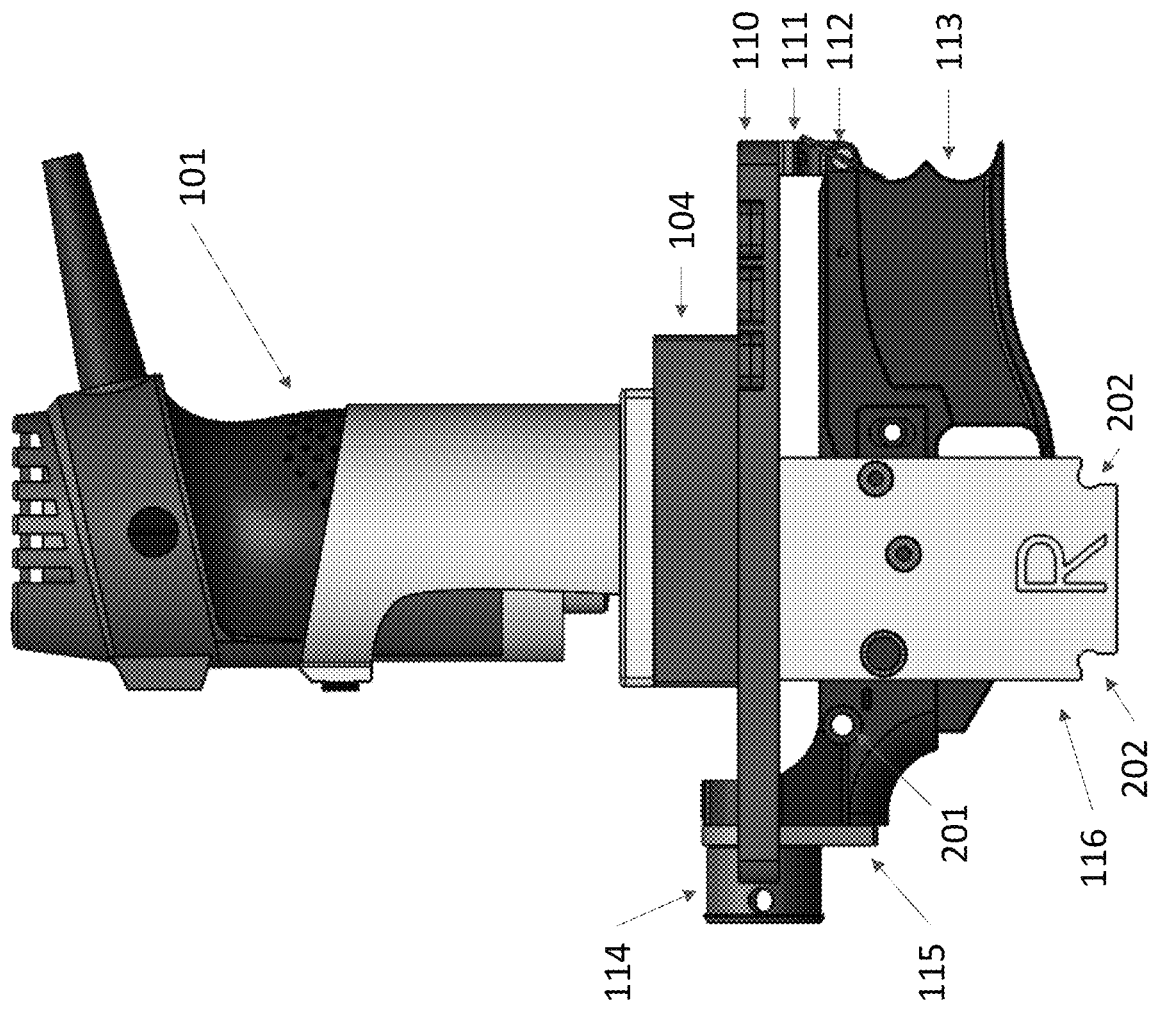
FIG. 2 is an assembled right side view of the firearm lower receiver, advanced jig, and rotary power tool of FIG. 1, according to the illustrative embodiment.

FIG. 2 is an assembled right side view of the firearm lower receiver, advanced jig rotary tool, and rotary power tool of FIG. 1 according to the illustrative embodiment. FIG. 2 depicts the jig 100 assembled around the lower receiver 113 with the rotary power tool 101 in a location to allow engagement with the lower receiver 113 so work can be performed on the lower receiver 113. The lower receiver 113 can be situated between the right carriage plate 116 and the left carriage plate. There can be a narrow gap between the carriage plates and the sides of the lower receiver 113. The gap can prevent contact between the surfaces of the carriage plates with the surface of the lower receiver 113 and thereby can prevent possible scratching of the surface coating of the lower receiver. In various embodiments, the carriage plates can have an external flexible coating (for example, a polymer) and the carriage plates can make contact with the surface of the lower receiver 113. In various embodiments, a removable foam pad or tape can be provided between the lower receiver and the carriage plates during assembly to avoid inadvertent contact between the carriages sand the receiver during assembly of the jig 100 or during milling/drilling.

The various plates of the jig assembly can be constructed from a variety of materials, or combination of materials—for example aluminum alloy, steel, polymer (e.g. Delrin® (from Dupont), polycarbonate, acrylic, etc.). The thickness of each plate can be highly variable, and can depend in part upon the choice of material(s). By way of non-limiting example, the thickness of the jig assembly plate(s) can be between 1/32 and 1 inch, or greater, for sufficient strength and rigidity. Likewise, the guide plate 110 should be sufficiently thick to allow the rotary tool 108 to resist wobble. The various plates can be constructed from sheet stock and milled to shape using, e.g. CNC manufacturing techniques. In various embodiments, other methods of constructing the plates can be employed, for example stamping or casting with finish milling, 3D printing, molding, etc.

Right carriage plate 116 and left carriage plate can have notches 202 that can be at the bottom corners of the carriage plates. Notches 202 can allow the carriage plates to be clamped in a vice, clamp or other holding device. The vice jaws can clamp onto the notches in a forward-rear orientation with the top of the jaws engaged with the bottom surface of notches 202. Notches 202 can allow for leveling of the jig 100 and provide for a more stable platform.

Figure 3:
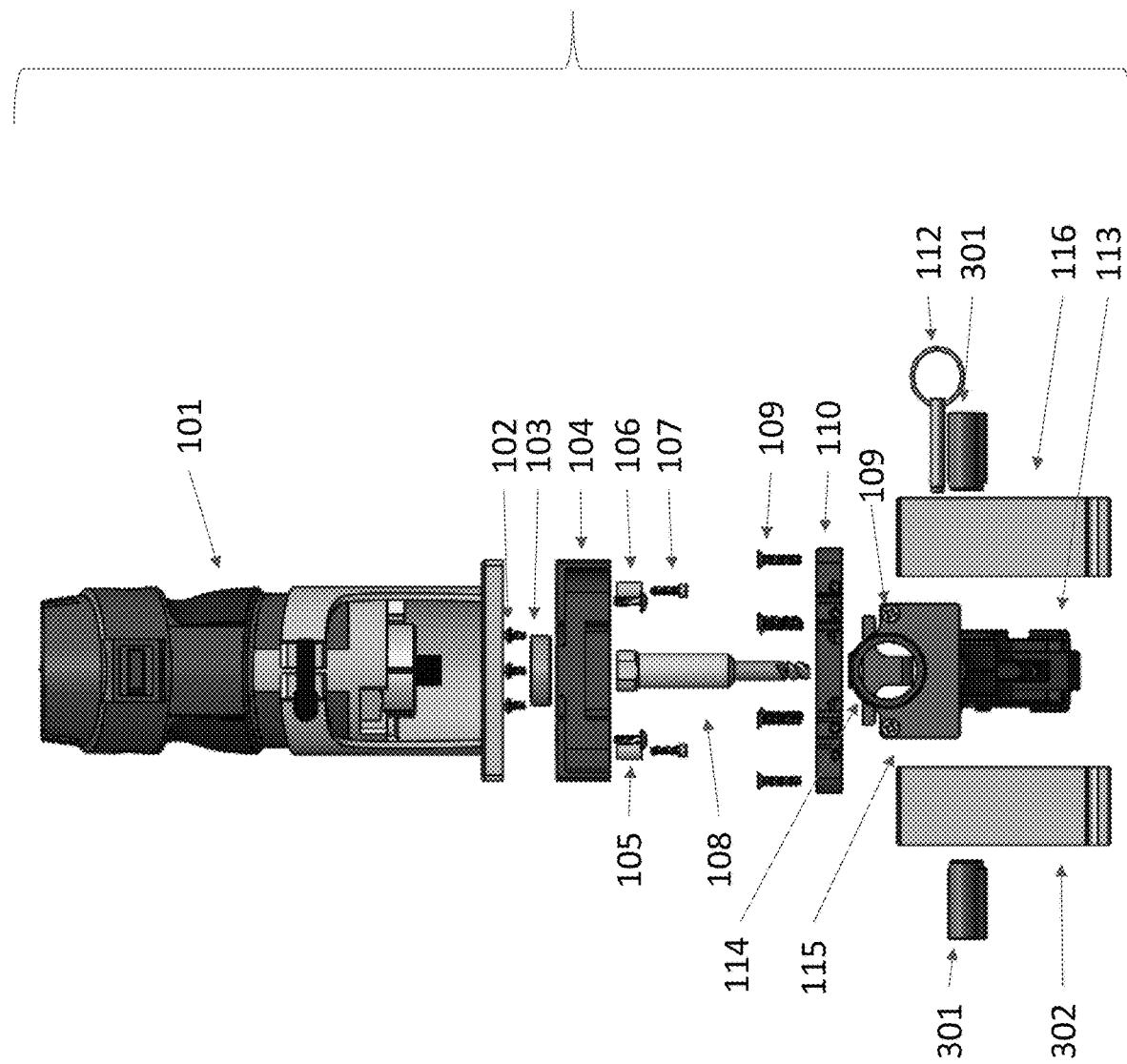
FIG. 3 is an exploded rear view of the firearm lower receiver, advanced jig, rotary tool, and rotary power tool of FIG. 1, according to the illustrative embodiment.

FIG. 3 is an exploded rear view of the firearm lower receiver, advanced jig, rotary tool, and rotary power tool of FIG. 1, according to the illustrative embodiment. Plate screws 109 can be aligned with corresponding screw holes in buffer support 115. Buffer locator 114 can be aligned with a corresponding hole in the buffer support 115 and the corresponding threaded opening in the lower receiver 113. Left carriage 302 can be positioned to the left of the lower receiver 113, and right carriage 116 can be positioned to the right of the lower receiver 113. Although two carriage plates are described in the illustrative embodiment of FIG. 3, it is specifically contemplated that in various embodiments a single carriage plate can be used. Such a single plate can include appropriate brackets or other structures to maintain it in confronting, accurate engagement with the side of the lower receiver 113 and/or guide plate 110.

In various embodiments, the carriages 116 and 302 can include bushings 301. The bushings 301 can be engaged with the carriages 116 and 302 to increase their wear resistance. The bushings 301 can be made from various materials including, for example, steel, stainless steel, iron, nickel, aluminum alloy, titanium, carbide and other similarly hard and wear resistant materials. In various embodiments, the carriages may be free of bushings 301.

Figure 4:
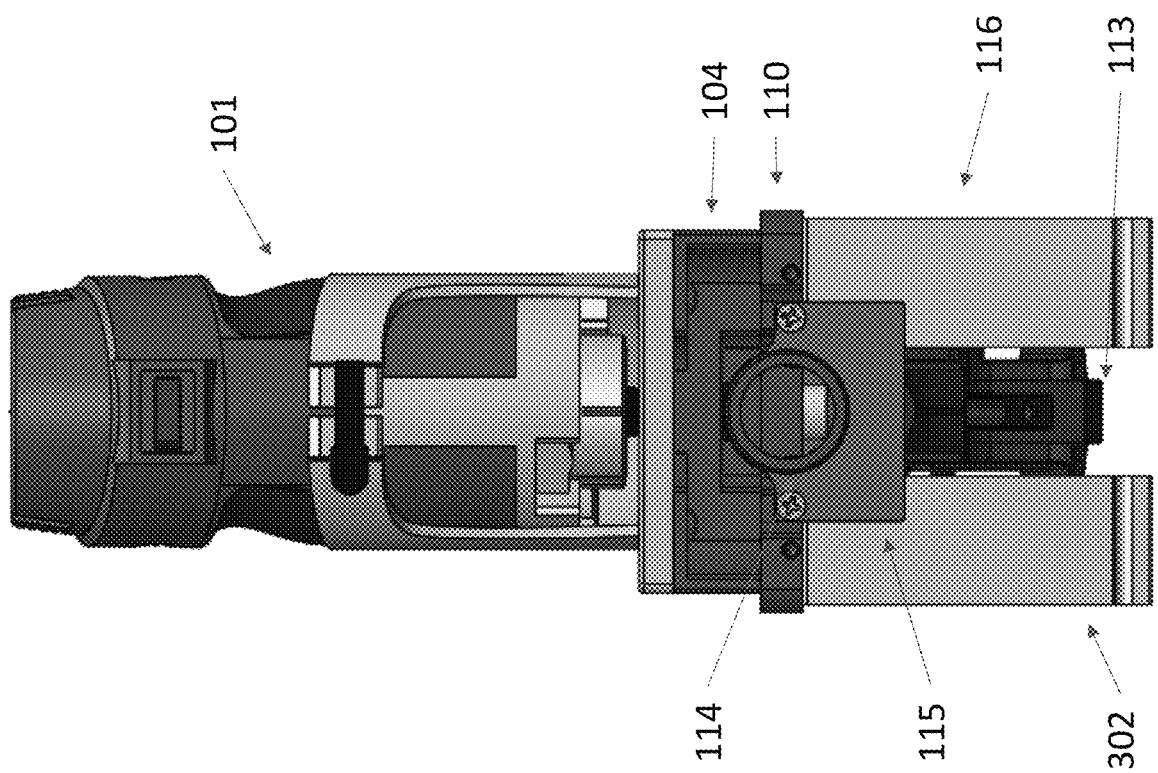
FIG. 4 is an assembled rear view of the firearm lower receiver, advanced jig, and rotary power tool of FIG. 1, according to the illustrative embodiment.

FIG. 4 is an assembled rear view of the firearm lower receiver, advanced jig, and rotary power tool of FIG. 1, according to the illustrative embodiment. FIG. 4 depicts an embodiment of the assembled jig 100 that is ready for operation in finishing a lower receiver 113. The carriage plates 116 and 302 can be situated on their respective sides of the lower receiver 113.

Figure 5:
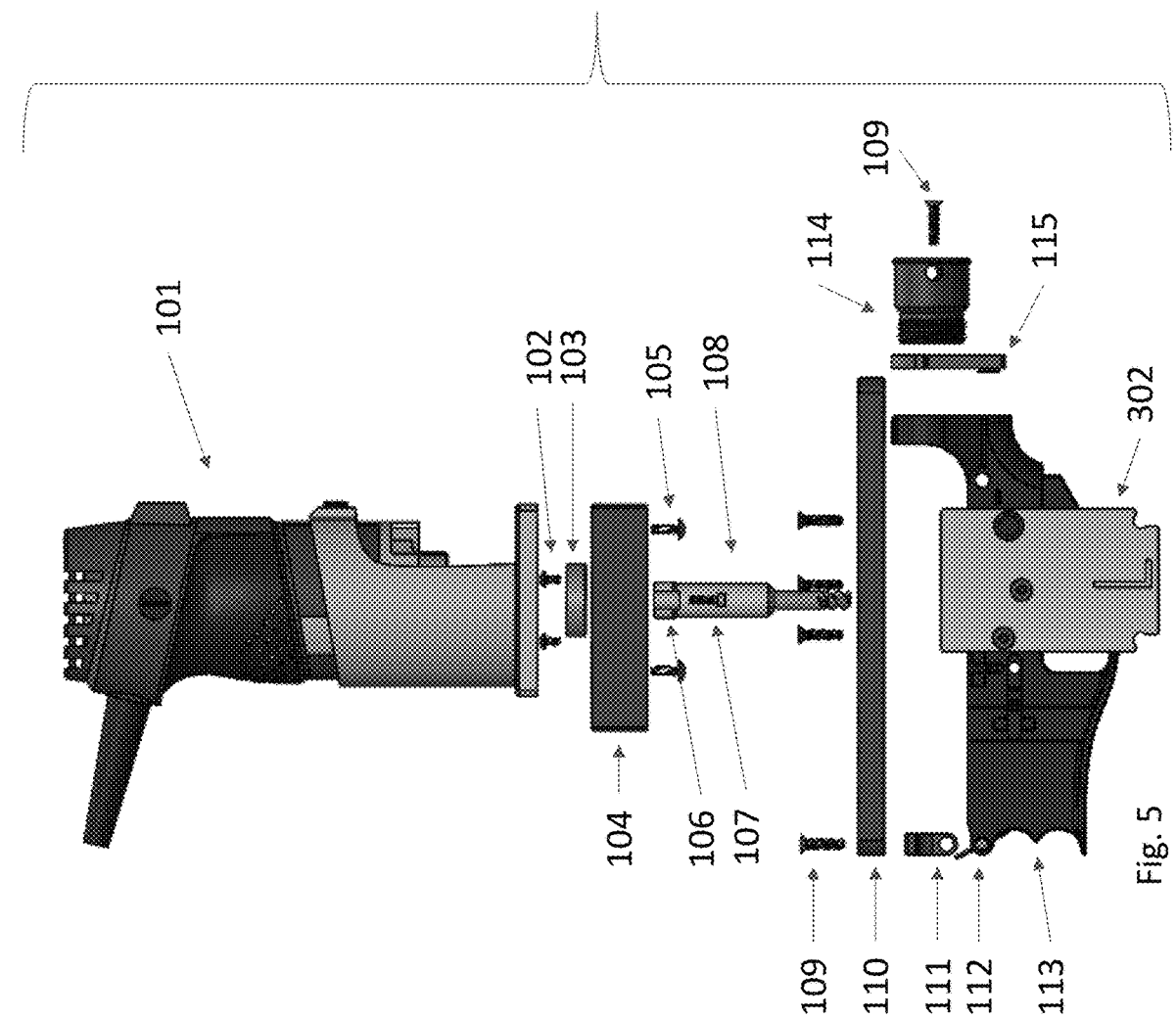
FIG. 5 is an exploded left side view of the firearm lower receiver, advanced jig, rotary tool, and rotary power tool of FIG. 1, according to the illustrative embodiment.

FIG. 5 is an exploded left side view of the firearm lower receiver, advanced jig, rotary tool, and rotary power tool of FIG. 1, according to the illustrative embodiment. Guide plate 110 can be supported by the front support 111 and the buffer support 115. Adaptor 104 can be supported on guide plate 110. Guide plates 110 and adaptor 104 can support the rotary power tool 101 above the lower receiver 113 such that the rotary power tool 101 is not resting upon the lower receiver 113.

As described above, the left carriage plate 302 is also provided with three drill guide holes for the location of and drilling of pivot/pin holes into the lower receiver 113. The three drill guide holes 118, 120, and 121 in left carriage plate 302 correspond to and are aligned with the drill guide holes 118, 120 and 121, in the right carriage plate respectively and define the same dimensions. However, in various embodiments in which a pin/pivot defines different diameters on each side of the lower receiver, or is eccentric, the diameter or placement of the left carriage hole can vary relative to that of the right carriage hole.

Figure 6:
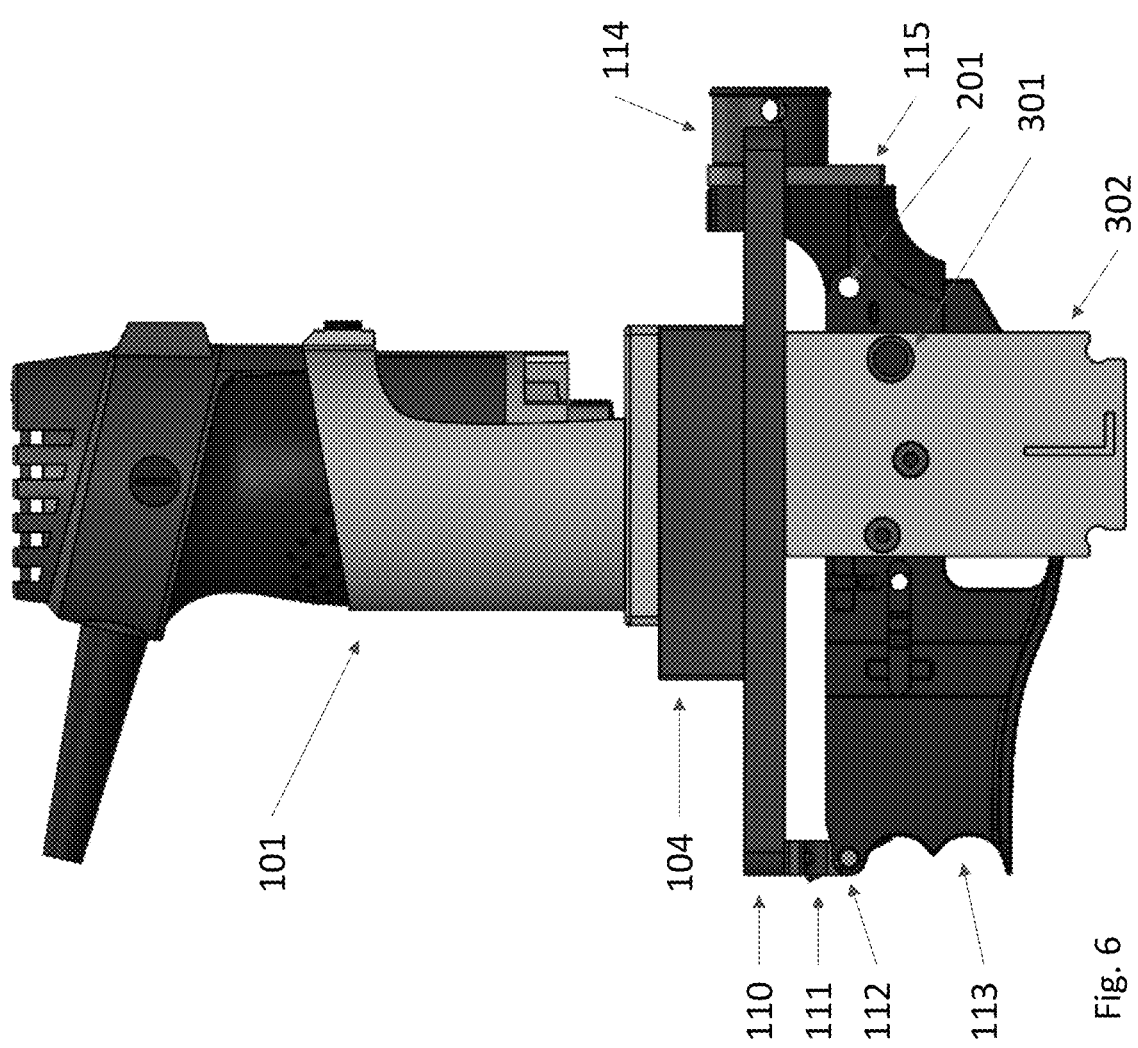
FIG. 6 is an assembled left side view of the firearm lower receiver, advanced jig, and rotary power tool of FIG. 1, according to the illustrative embodiment.

FIG. 6 is an assembled left side view of the firearm lower receiver, advanced jig, and rotary power tool of FIG. 1, according to the illustrative embodiment. Guide plate 110 can be supported by the front support 111 and the buffer support 115; adaptor 104 can be supported on guide plate 110; and rotary power tool 101 can be supported on guide plates 110 and adaptor 104. Rotary tool 108 can be attached to the rotary power tool 101 and supported from above.

Figure 7:
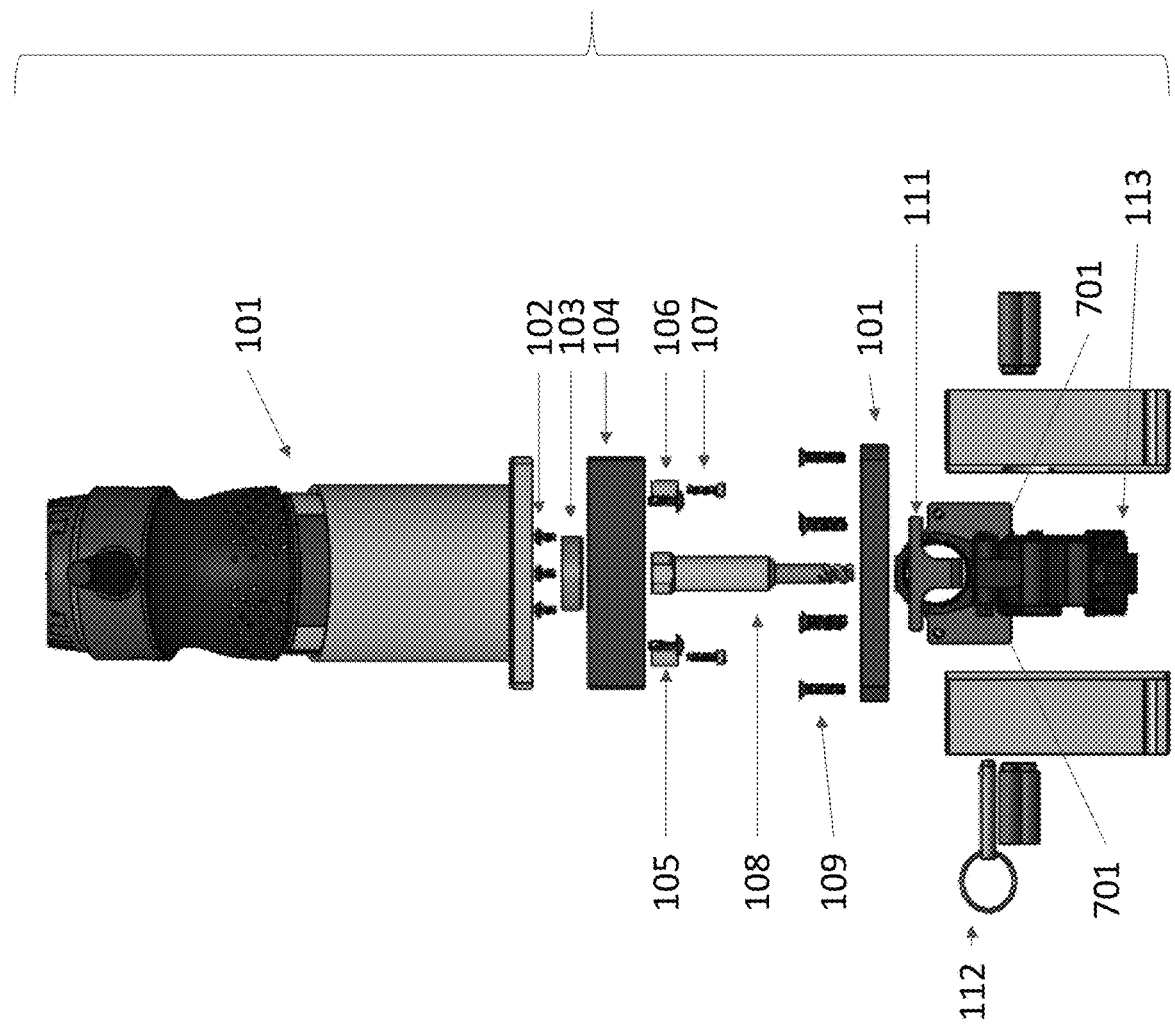
FIG. 7 is an exploded front view of the firearm lower receiver, advanced jig, rotary tool, and rotary power tool of FIG. 1, according to the illustrative embodiment.

FIG. 7 is an exploded front view of the firearm lower receiver 113, advance jig, rotary tool, and rotary power tool of FIG. 1, according to the illustrative embodiment lower receiver 113 can have locating ears 701. The front support 111 can be placed between the locating ears 701, and the pin 112 can be inserted through the locating ears 701 on the lower receiver 113 such that the pin 112 passes through the front support 111 and the locating ears 701, thereby locking the front support 111 to the lower receiver 113. The locating ears can have through holes in the lower receiver 113. In another embodiment, pin 112 can be a bolt that can be used for locking the support in place.

Figure 8:
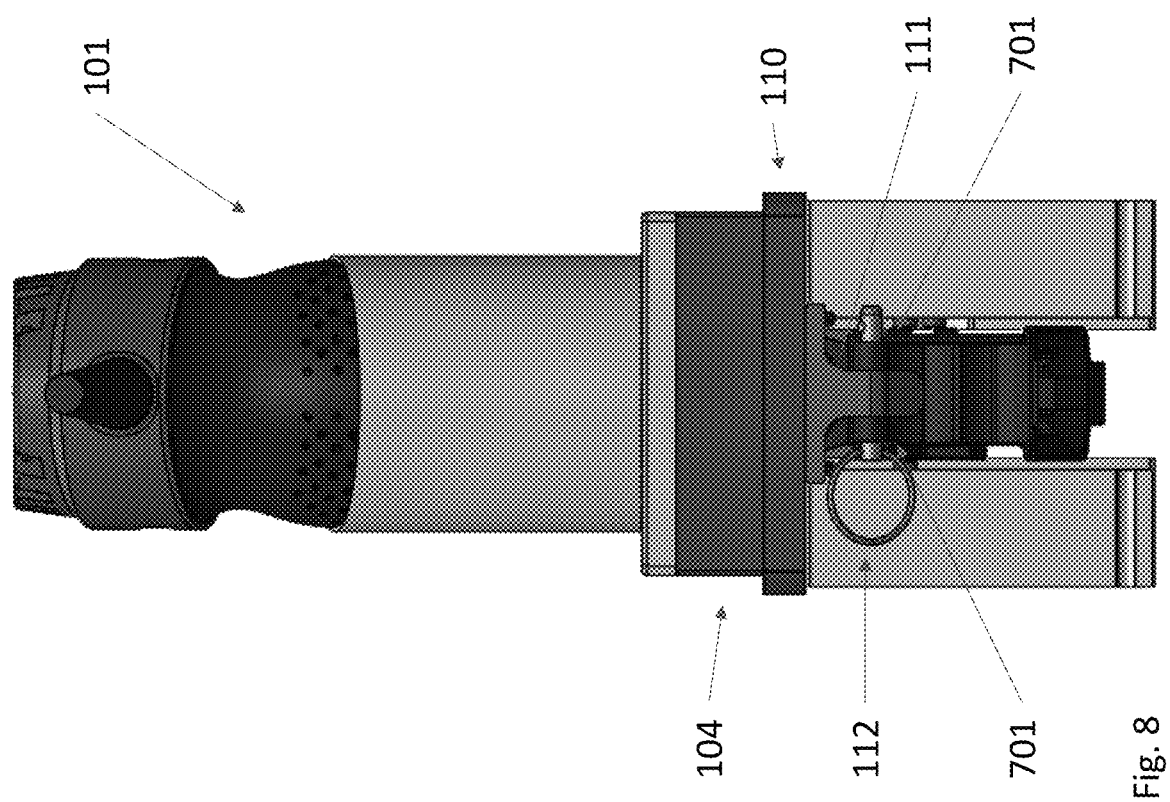
FIG. 8 is an assembled front view of the firearm lower receiver, advanced jig, and rotary tool of FIG. 1, according to the illustrative embodiment.

FIG. 8 is an assembled front view of the firearm lower receiver, advanced jig, and rotary power tool of FIG. 1, according to the illustrative embodiment. Locating pin 112 can extend through the front support 111 and the locating ears 701, thereby securing the front support 111 to the power receiver. The locating pin 112 can be removable and can be situated in a location along the front takedown pin hole of a firearm receiver.

Figure 9B:
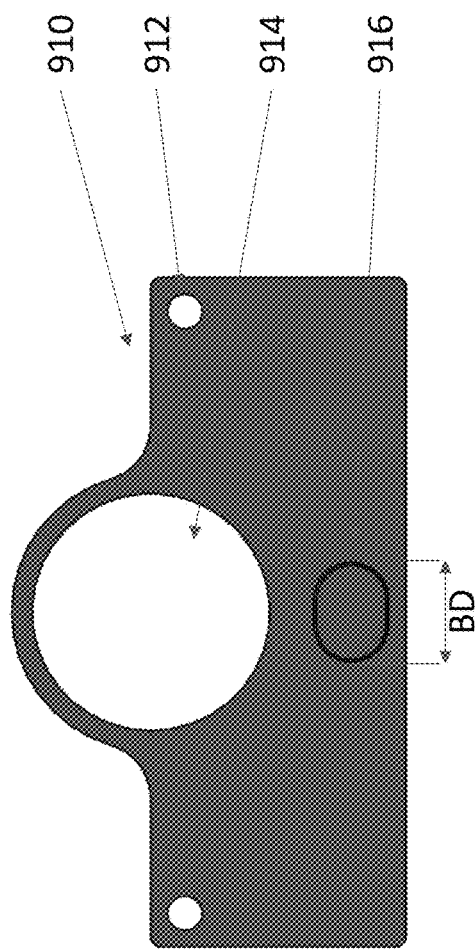
FIG. 9B is a front view of a AR10 buffer support, according to an illustrative embodiment.
Figure 9A:
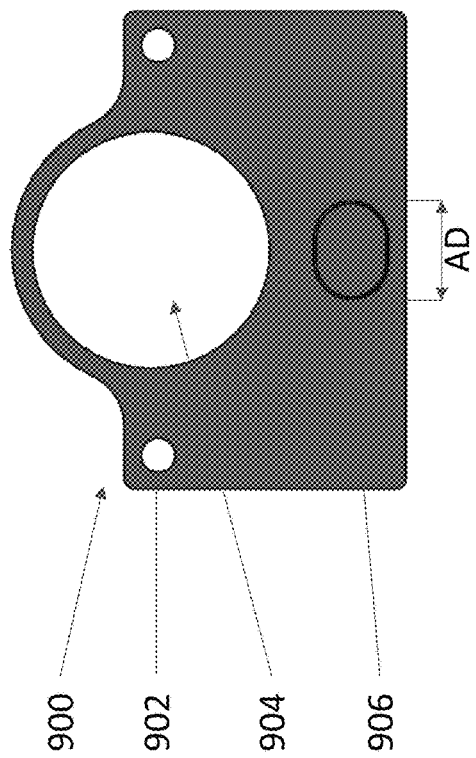
FIG. 9A is a front view of a AR15 buffer support, according to an illustrative embodiment.

FIG. 9A is a front view of a AR15 buffer support, according to an illustrative embodiment. Jig 100 can be used with a variety of lower receiver, including, but not limited to, an AR15. AR15 buffer support 900 can be specially adapted for use with jig 100 and an AR15 lower receiver. It should be clear that various buffer supports can be adapted for use with jig 100 and various specific lower receiver. AR15 buffer support 900 can have buffer attachment holes 902, a buffer locator hole 904, and a boss 906. Buffer attachment holes 902 can allow screws 109 to extend through the AR15 buffer support 900. Turning to FIGS. 1 and 9A, screws 109 can be inserted through attachment holes 902 to attach the AR15 buffer support 900 to the guide plate 110. This can allow the connection to guide plate 110. Other methods of mechanical and chemical attachment are applicable and can be used in various embodiments. Buffer locator hole 904 can pass through AR15 buffer support 900 to allow buffer locator 114 to extend through the AR15 buffer support 900. Buffer locator 114 can be inserted through buffer locator hole 904 and threaded into an AR15 lower receiver to position the AR15 buffer support 900 on the AR15 lower receiver. Boss 906 can protrude from AR15 buffer support 900 to engage with an AR15 buffer tube alignment hole (shown in FIG. 12). Boss 906 can have a boss diameter AD adapted to accurately engage with buffer tube alignment hole on an AR15. For example, boss diameter AD can be approximately ½ inch. Boss 906 can allow guide plate 110 to be aligned parallel and flat with respect to the AR15 lower receiver without the need for an AR15 rear takedown pin. Turning to FIGS. 2 and 9A, a lower receiver can have a rear takedown pin hole 201 adapted for a rear takedown pin to be inserted therethrough. Without the need for an AR15 rear takedown pin in rear takedown pin hole 201, carriages 116 and 302 can be less substantial in size and weight while reducing part count and complexity. In various embodiments, boss 906 can be unitary with AR15 buffer support 900. In various embodiments, boss 906 can be a separate component from AR15 buffer support 900. A boss 906 that can be a separate component from AR15 buffer support 900 can be attached via mechanical or chemical connection, for example boss 906 can be threaded and a screw could be used to connect boss 906 to AR15 buffer support 900, or boss 906 can be glued or epoxied to AR15 buffer support 900, or other various means of attachment.

FIG. 9B is a front view of a AR10 buffer support, according to an illustrative embodiment. Jig 100 can be used with a variety of lower receiver, including, but not limited to an AR10. AR10 buffer support 910 can be specially adapted for use with jig 100 and an AR10 lower receiver. It should be clear that various buffer supports can be adapted for use with jig 100 and various specific lower receivers. AR10 buffer support 910 can have buffer attachment holes 912, a buffer locator hole 914, and a boss 916. Buffer attachment holes 912 can allow screws 109 to extend through the AR10 buffer support 910. Turing to FIGS. 1 and 9B, screws 109 can be inserted through attachment holes 912 to attach the buffer support 910 to the guide plate 110. This can allow the connection to guide plate 110. Other methods of mechanical and chemical attachment are applicable and can be used in other embodiments. Buffer locator pole 914 can pass through AR10 buffer support 910 to allow buffer locator 114 to extend through the AR10 buffer support 910. Buffer locator 114 can be inserted through buffer locator hole 914 and threaded into an AR10 lower receiver to position the AR10 buffer support 910 on the AR10 lower receiver (shown in FIG. 13). Boss 916 can protrude from AR10 buffer support 910 to engage with an AR10 buffer tube alignment hole (shown in FIG. 13). Boss 916 can have a boss diameter BD adapted to accurately engage with a buffer tube alignment hole on an AR10. For example, boss diameter BD can be approximately ½ inch. Box 916 can allow guide plate 110 to be aligned parallel and flat with respect to the AR10 lower receiver without the need for an AR10 rear takedown pin. Turning to FIGS. 2 and 9B, a lower receiver can have a rear takedown pin hole 201 adapted for a rear takedown pin to be inserted therethrough. Without the need for a AR10 rear takedown pin in rear takedown pin hole 201, carriages 116 and 302 can be less substantial in size and weight while reducing part count and complexity. In various embodiments, boss 916 can be unitary with AR10 buffer support 910. In various embodiments, boss 916 can be a separate component from AR10 buffer support 910. A boss 916 that can be a separate component from AR10 buffer support 910 can be attached via mechanical or chemical connection, for example boss 916 can be threaded and a screw could be used to connect boss 916 to AR10 buffer support 910, or boss 916 can be glued or epoxied to AR10 buffer support 910, or other various means of attachment.

Figure 10B:
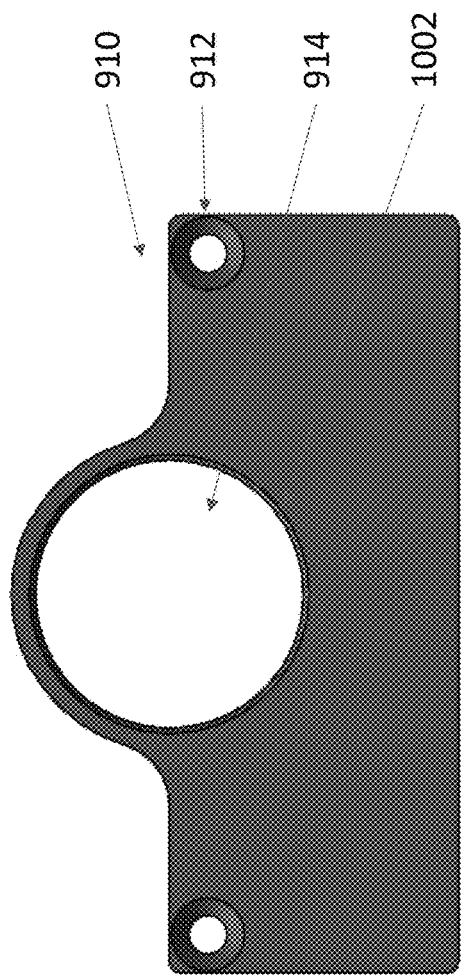
FIG. 10B is a rear view of the AR10 buffer support, according to the illustrative embodiment.
Figure 10A:
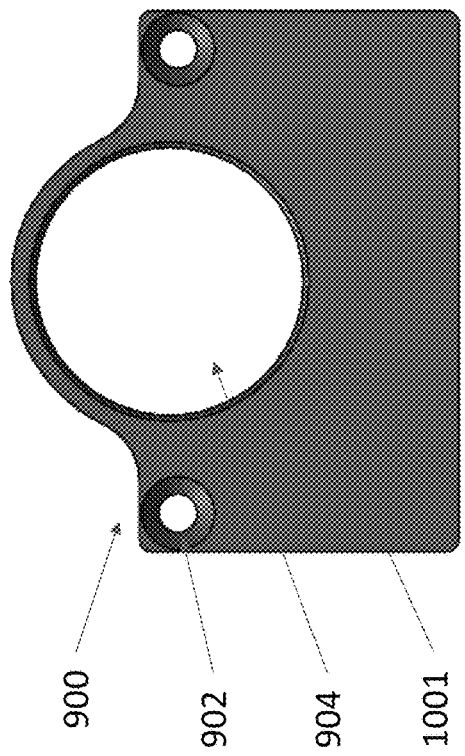
FIG. 10A is a rear view of the AR15 buffer support, according to the illustrative embodiment.

FIG. 10A is a rear view of the AR15 buffer support, according to the illustrative embodiment. AR15 buffer support 900 can have buffer attachment holes 902 through it for screws 109 to extend through buffer attachment holes 902. Turning to FIGS. 1 and 10A, screws 109 can be inserted through attachment holes 902 to attach the AR15 buffer support 900 to guide plate 110. Other methods of mechanical and chemical attachment are applicable and can be used in various embodiments. Buffer locator hole 904 can pass through AR15 buffer support 900 to allow buffer locator 114 to extend through the AR15 buffer support 900. Buffer locator 114 can be inserted through buffer locator hole 904 and threaded into an AR15 lower receiver to position the AR15 buffer support 900 on the AR15 lower receiver. Buffer locator hole 904 can have a chamfer 1001 on the leading edge of buffer locator hole 902. Chamfer 1001 can aid a user in engaging buffer locator 114 in buffer locator hole 902 when the user inserts the buffer locator 114 through buffer locator hole 902 and threads buffer locator 114 into the AR15 lower receiver to allow accurate positioning of AR15 support 900 with the AR15 lower receiver. Chamfer 1001 may not be required for all applications but can assist in alignment.

FIG. 10B is a rear view of the AR10 buffer support, according to the illustrative embodiment. AR10 buffer support 910 can have buffer attachment holes 912 through it for screws 109 to extend through buffer attachment holes 912. Turning to FIGS. 1 and 10B, screws 109 can be inserted through attachment holes 912 to attach the AR10 buffer support 910 to guide plate 110. Other methods of mechanical and chemical attachment are applicable and can be used in various embodiments. Buffer locator hole 914 can pass through AR10 buffer support 910 to allow buffer locator 114 to extend through the AR10 buffer support 910. Buffer locator 114 can be inserted through buffer locator hole 914 and threaded into an AR10 lower receiver to position the AR10 buffer support 910 on the AR10 lower receiver. Buffer locator hole 914 can have a chamfer 1002 on the leading edge of buffer locator hole 902. Chamfer 1002 can aid a user in engaging buffer locator 114 in buffer locator hole 914 when the user inserts the buffer locator 114 through buffer locator hole 914 and threads buffer locator 114 into the AR10 lower receiver to allow accurate positioning of the AR10 buffer support 910 with the AR10 lower receiver. Chamfer 1002 may not be required for all applications but can assist in alignment.

FIG. 11A is a perspective view of the AR15 buffer support, according to the illustrative embodiment. Boss 906 can extend outwards from the AR15 buffer support 900, so that boss 906 can engage with the buffer tube alignment hole of an AR15 lower receiver. FIG. 11B is a perspective view of the AR10 buffer support, according to the illustrative embodiment. Boss 916 can extend outwards from the AR10 buffer support 910, so that boss 916 can engage with the buffer tube alignment hole of an AR10 lower receiver.

Figure 12:
FIG. 12 is an exploded perspective view of the AR15 firearm lower receiver and the AR15 buffer support, according to the illustrative embodiment.

FIG. 12 is an exploded perspective view of the AR15 firearm lower receiver and the AR15 buffer support, according to the illustrative embodiment. An AR15 lower receiver 1200 can have buffer threads 1201 and a buffer alignment hole 1202. AR15 buffer support 900 can be positioned to align with and engage with an AR15 lower receiver 1200. Boss 906 can engage and align with alignment hole 1202. This engagement can add rigidity and prevent guide plate 110 from wobbling after guide plate 110 is attached to the AR15 buffer support 910. Turning to FIGS. 1 and 12, buffer locator 114 can pass through AR15 buffer support 900 and thread into the AR15 buffer threads 1202 of the lower receiver. This thread engagement can allow for the AR15 buffer support 900 to be firmly attached to the AR15 lower receiver 1200.

Figure 13:
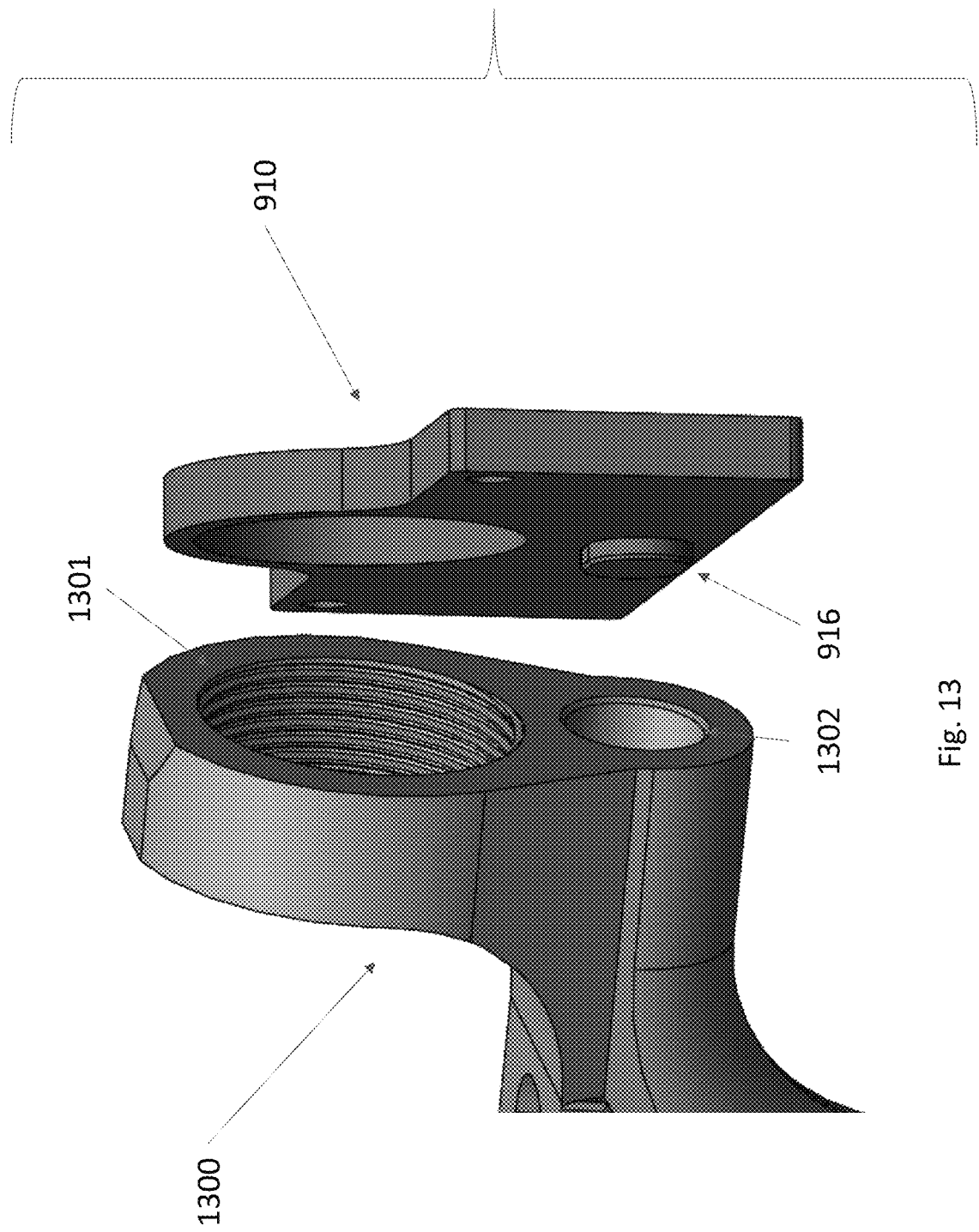
FIG. 13 is an exploded perspective view of the AR10 firearm lower receiver and the AR10 buffer support, according to the illustrative embodiment.

FIG. 13 is an exploded perspective view of the AR10 firearm lower receiver and the AR10 buffer support, according to the illustrative embodiment. An AR10 lower receiver 1300 can have buffer threads 1301 and a buffer alignment hole 1302. AR10 buffer support 910 can be in a positioned to align with and engage with an AR10 lower receiver 1300. Boss 916 can engage and align with alignment hole 1302. This engagement can add rigidity and prevent guide plate 110 from wobbling after guide plate 110 is attached to the AR10 buffer support 910. Turning to FIGS. 1 and 13, Buffer locator 114 can pass through AR10 buffer support 910 and thread into the AR10 buffer threads 1301 of the lower receiver. This thread engagement can allow for the AR10 buffer support 900 to be firmly attached to the AR15 lower receiver 1303.

Figure 14B:
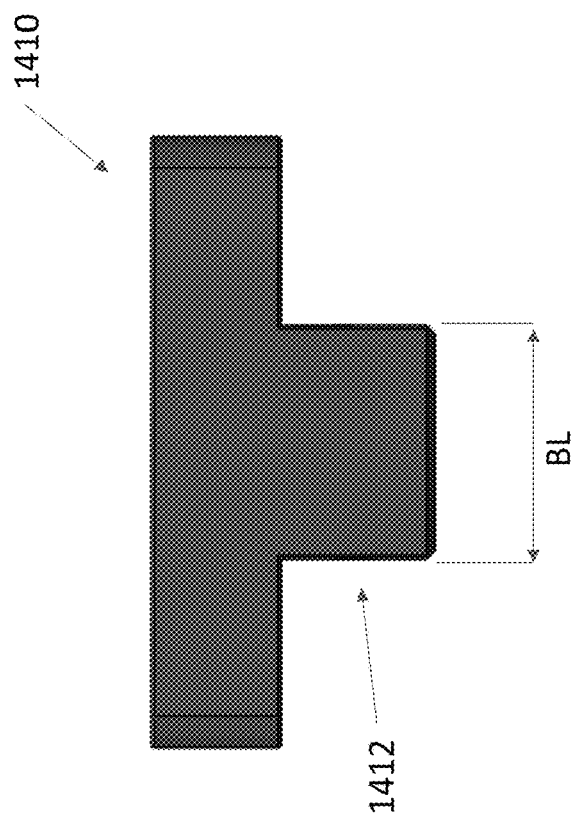
FIG. 14B is a front view of an AR10 front support, according to the illustrative embodiment.
Figure 14A:
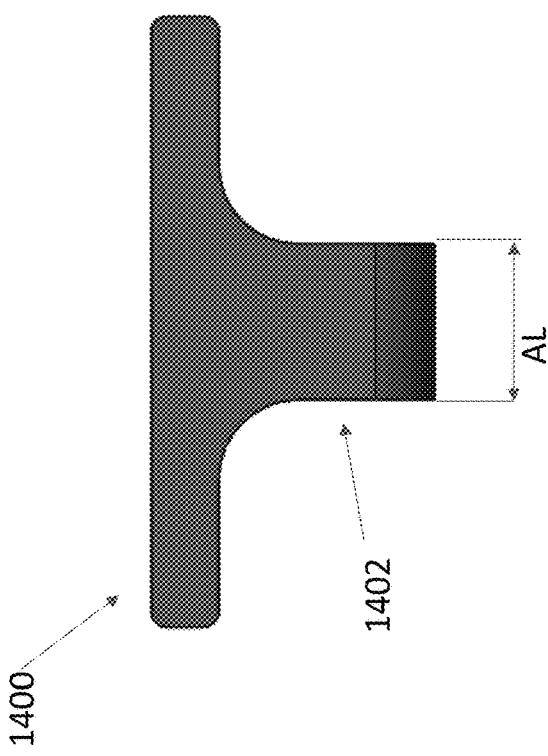
FIG. 14A is a front view of an AR15 front support, according to an illustrative embodiment.

FIG. 14A is a front view of an AR15 front support, according to an illustrative embodiment. Jig 100 can be used with a variety of lower receivers, including, but not limited to, an AR15. AR15 front support 1400 can be specially adapted for use with jig 100 and an AR15 lower receiver. If should be clear that various buffer supports can be adapted for use with jig 100 and various specific lower receiver. Various shapes and contours of the AR15 front support 1400 can be specially adapted to fit within the shapes and contours of the AR15 lower receiver. An AR15 front support 1400 can have a support tooth 1402 that can have a support length AL. Support length AL can be an appropriate width to accurately engage with AR15 lower receiver mounting ears. A close fit between the support tooth 1402 and the mounting ears can be necessary for the jig 100 to be accurately positioned around AR15 lower receiver 1200. If support length AL is too wide, the support tooth 1402 will not fit between the ears. If support length AL is too narrow, guide plate 110 might rock loosely atop the AR15 lower receiver 1200. Support length AL can be approximately ½ inch. The various shapes and contours of the AR15 front support 1400 can be specially adapted to fit precisely within the shapes and contours of the AR15 lower receiver.

FIG. 14B is a front view of an AR10 front support, according to the illustrative embodiment. Jig 100 can be used with a variety of lower receivers, including, but not limited to, an AR10. AR10 front support 1410 can be specially adapted for use with jig 100 and an AR10 lower receiver. It should be clear that various buffer supports can be adapted for use with jig 100 and various specific lower receiver. Various shapes and contours of the AR10 front support 1400 can be specially adapted to fit within the shapes and contours of the AR10 lower receiver. An AR10 front support 1410 can have a support tooth 1412 that can have a support length BL. Support length BL can be an appropriate width to accurately engage with AR10 lower receiver mounting ears (shown in FIG. 19). A close fit between the support tooth 1412 and the mounting ears can be necessary for the jig 100 to be accurately positioned around AR10 lower receiver 1300. If support length BL is too wide, the support tooth 1410 will not fit between the mounting ears. If the support length BL is too narrow, the guide plate 110 might rick loosely atop the AR10 lower receiver 1300. Support length BL can be approximately ¾ inch.

Figures 15A, 15B:
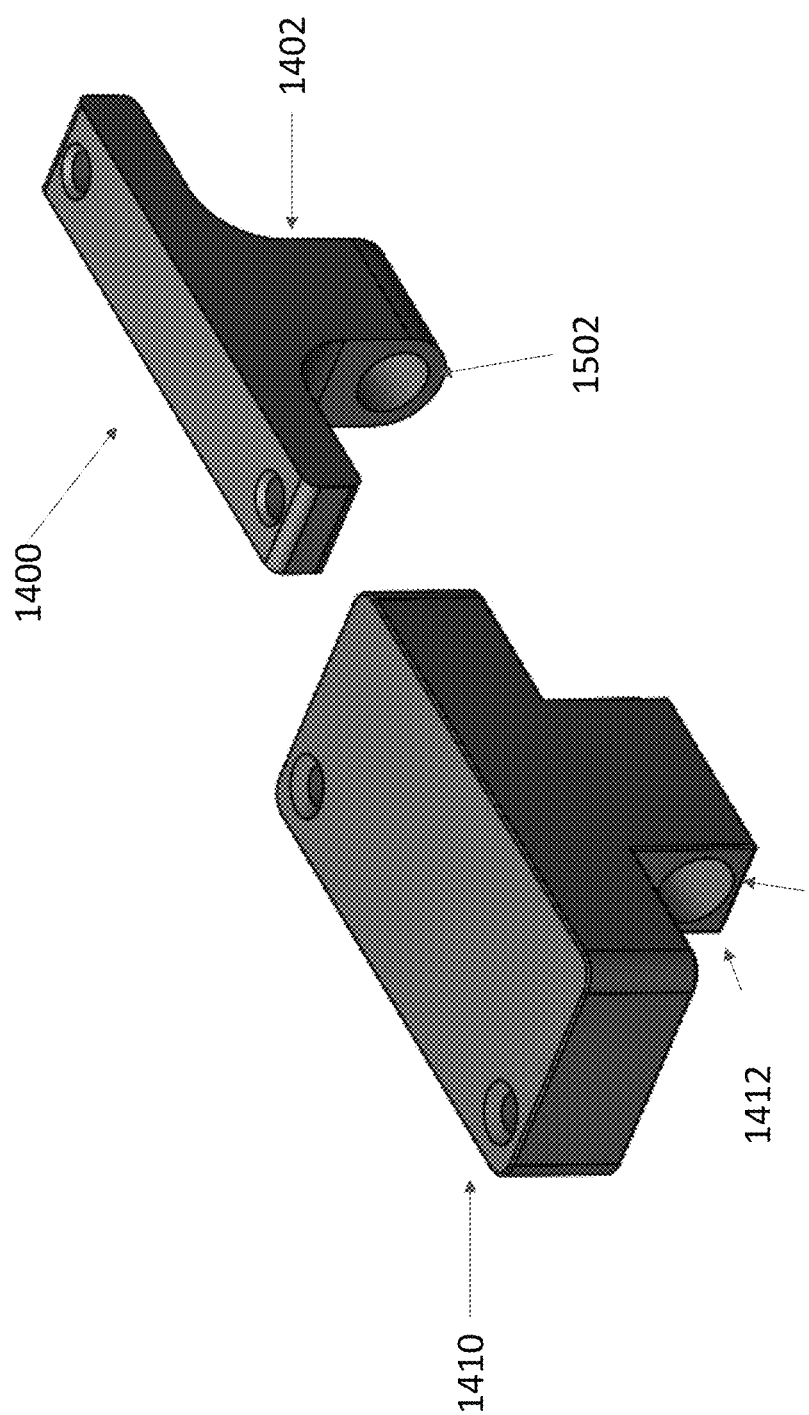
FIG. 15A is a perspective view of the AR15 front support, according to an illustrative embodiment.
FIG. 15B is a perspective view of the AR10 front support, according to the illustrative embodiment.

FIG. 15A is a perspective view of the AR15 front support, according to an illustrative embodiment. An AR15 front support 1400 can have a pin hole 1502 through the side of the support tooth 1402 to allow pin 112 to pass through the AR15 front support 1410. A user can insert a pin 112 through the pin hole 1502 and through the mounting ears 701 to lock the front support 1400 to the AR15 lower receiver. Hole 1502 is of appropriate size to match the front takedown size of an AR15 lower receiver 1200. Hole 1502 is approximately ¼ inch in diameter.

FIG. 15B is a perspective view of the AR10 front support, according to the illustrative embodiment. An AR10 front support 1410 can have a pin hole 1501 through the side of the support tooth 1412 to allow a front take down pin to pass through the AR10 front support. A user can insert an AR10 takedown pin (shown in FIG. 16) through the pin hole 1501 and through the mounting ears to lock the front support 1410 to the AR10 lower receiver 1300. Hole 1501 is of appropriate size to match the front takedown size of an AR10 lower receiver 1300. Hole 1501 is approximately 0.28 inch in diameter.

Figure 16:
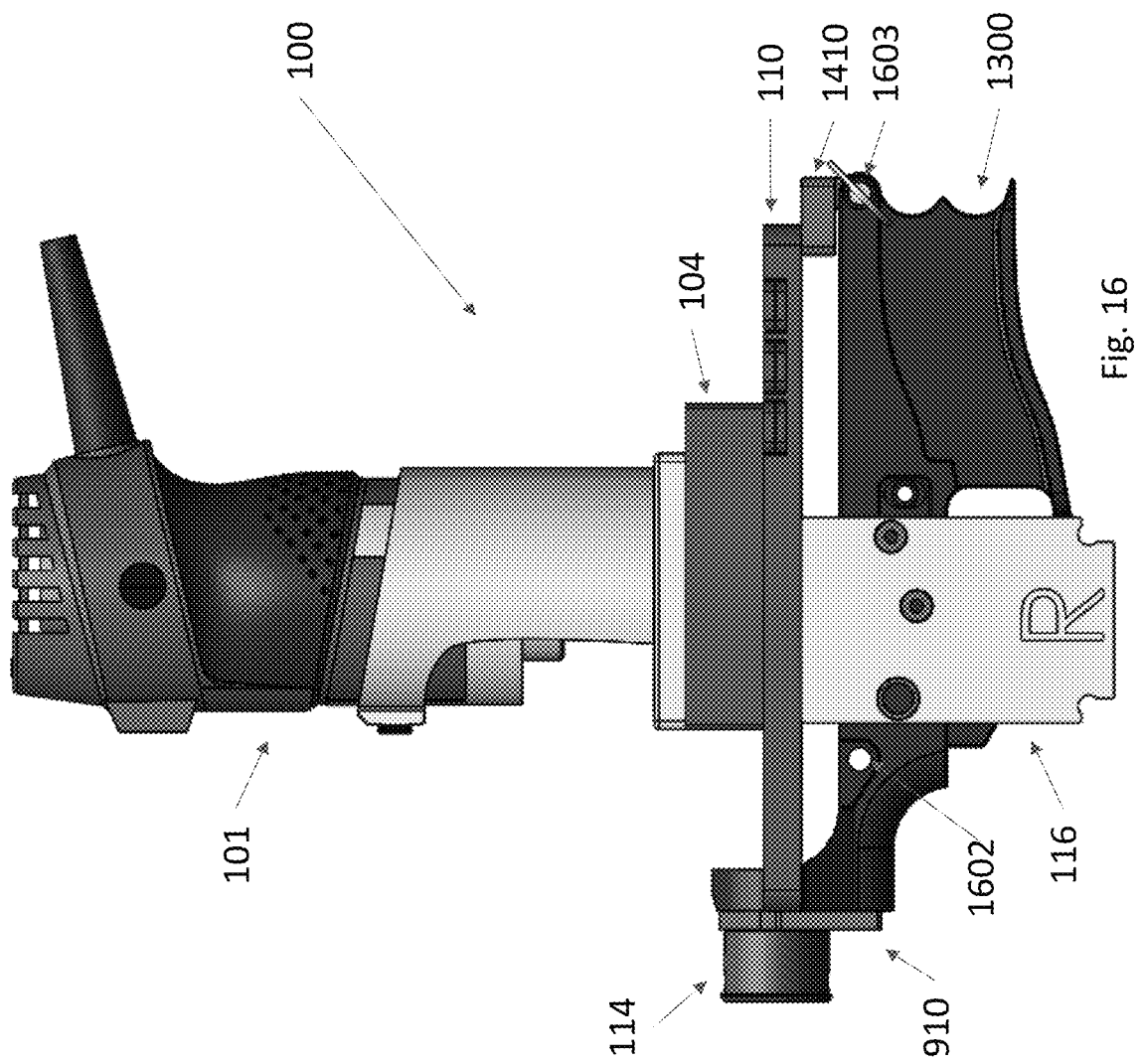
FIG. 16 is a right side view of the AR10 firearm lower receiver, an alternative advanced jig, and rotary power tool, according to the illustrative embodiment.

FIG. 16 is a right side view of the AR10 firearm lower receiver, an advanced jig, and rotary power tool, according to an illustrative embodiment. A jig assembly 100 can be engaged with an AR10 lower receiver 1300 and a rotary power tool 101. An AR10 buffer support 910 can be engaged with guide plate 110. Buffer locator 114 can extend through the AR10 buffer support 910 and can be threaded into the AR10 lower receiver 1300. The AR10 lower receiver 1300 shown in FIG. 16 is a form of popular AR-style receivers (including, for example, the AR-10, AR-308, LR308, and variants thereof), however, it should be clear that the system and method described herein can be used with a variety of other lower receivers in addition to the AR10 shown in the illustrative example in FIG. 16. The lower receiver is the portion of the firearm that includes a buffer mount, pistol grip mount, trigger mechanism and magazine well. The upper receiver contains the barrel, chamber and bolt assembly. The lower receiver can be attached to the upper receiver by two takedown pins. The firearm can be available in fully automatic and semi-automatic versions and in various calibers including; approximately 0.223 inch, approximately 0.243 inch, approximately 0.260 inch, approximately 0.308 inch, approximately 0.338 inch, approximately 0.358 inch, approximately 0.45 inch, approximately 6 mm, approximately 6.5 mm, approximately 7 mm and approximately 7.62 mm. In various embodiments, other calibers are possible.

Jig assembly 100 can use many of the same components when the jig assembly 100 is in use with an AR10 lower receiver, AR15 lower receiver, or other lower receiver. AR10 buffer support 910, AR10 front support 1410, and AR10 pin 1603 can be used to adapt jig 100 onto AR10 lower receiver 1300. The concept and principle can be the same as explained in regard to FIGS. 1-8. FIG. 16 depicts the use of jig 100 with another type of lower receiver, in this case an AR10. Buffer support 910, front support 1410, and pin 1603 are all adapted for use with an AR10 lower receiver 1300, however, similar components can be adapted for use with various lower receivers without departing from the scope of the present disclosure. The remaining components used in jig 100 can be universal and can be used with various lower receiver in addition to the AR15 and AR10. The adaptability of jig 100 to use cross compatible components and a modified buffer support, front support and pin allows the jig assemblies to fit various types of lower receivers in many styles and calibers without the need of a completely new jig. Using this system provides an inexpensive, accurate and simple jig for finishing multiple types of lower receivers.

Figure 17:
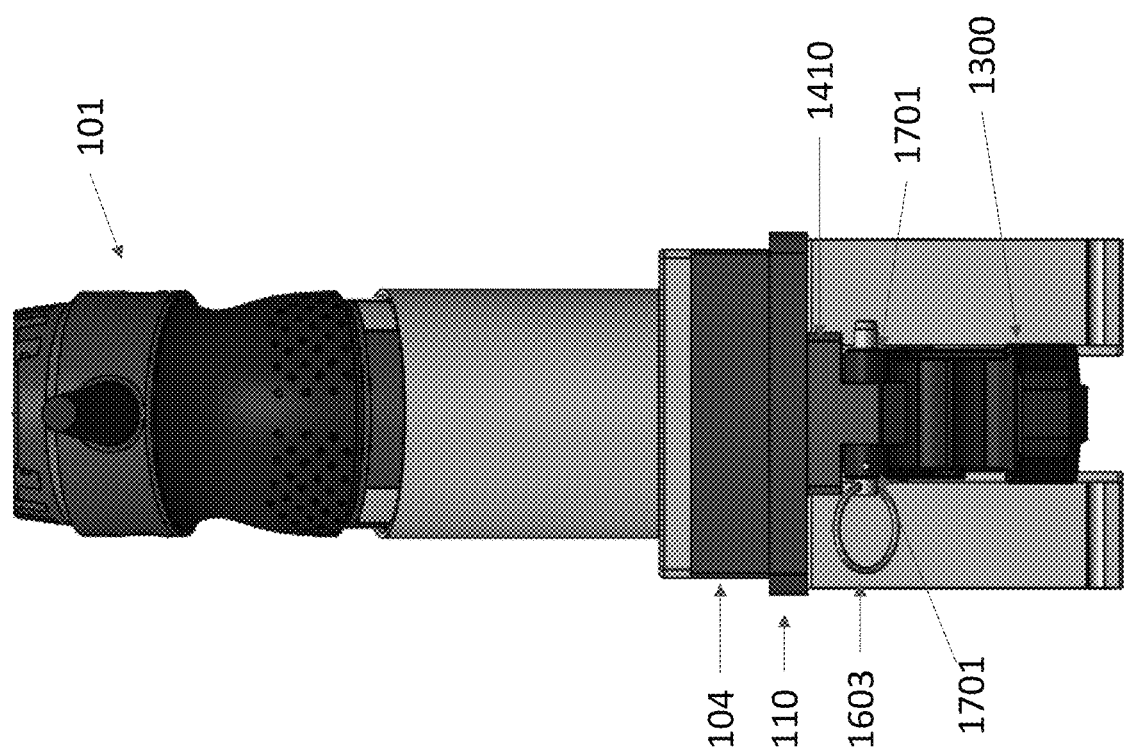
FIG. 17 is a front view of the AR10 firearm lower receiver, an alternative advanced jig, and rotary power tool of FIG. 17, according to the illustrative embodiment.

FIG. 17 is a front view of the AR10 firearm lower receiver, advanced jig, and rotary power tool of FIG. 16, according to the illustrative embodiment. Jig 100 can be engaged with an AR10 firearm lower receiver 1300 and a rotary power tool 101. AR10 lower receiver 1300 can have locating ears 1701. The AR10 front support 1410 can be placed between the locating ears 1701, and the AR10 pin 1603 can be inserted through the locating ears 1701 on the lower receiver 1300 such that the AR10 pin 1603 passes through the AR10 front support 1410 and the locating ears 1701, thereby locking the front support 1410 to the lower receiver 1300. The locating ears can be through holes in the lower receiver 1300. In various embodiments, pin 1603 can be a bolt that can be used for locking the support in place. Support length BL can be of appropriate width to accurately engage with AR10 lower receiver mounting ears 1701. A close fit can be necessary for the jig 100 to be accurately positioned around lower receiver 1300. If support length BL is too wide, it will not fit between the ears 1701. If it is too narrow, guide plate 110 could rock atop the lower receiver 1303. Support length BL can be approximately ¾ inch.

Figure 18:
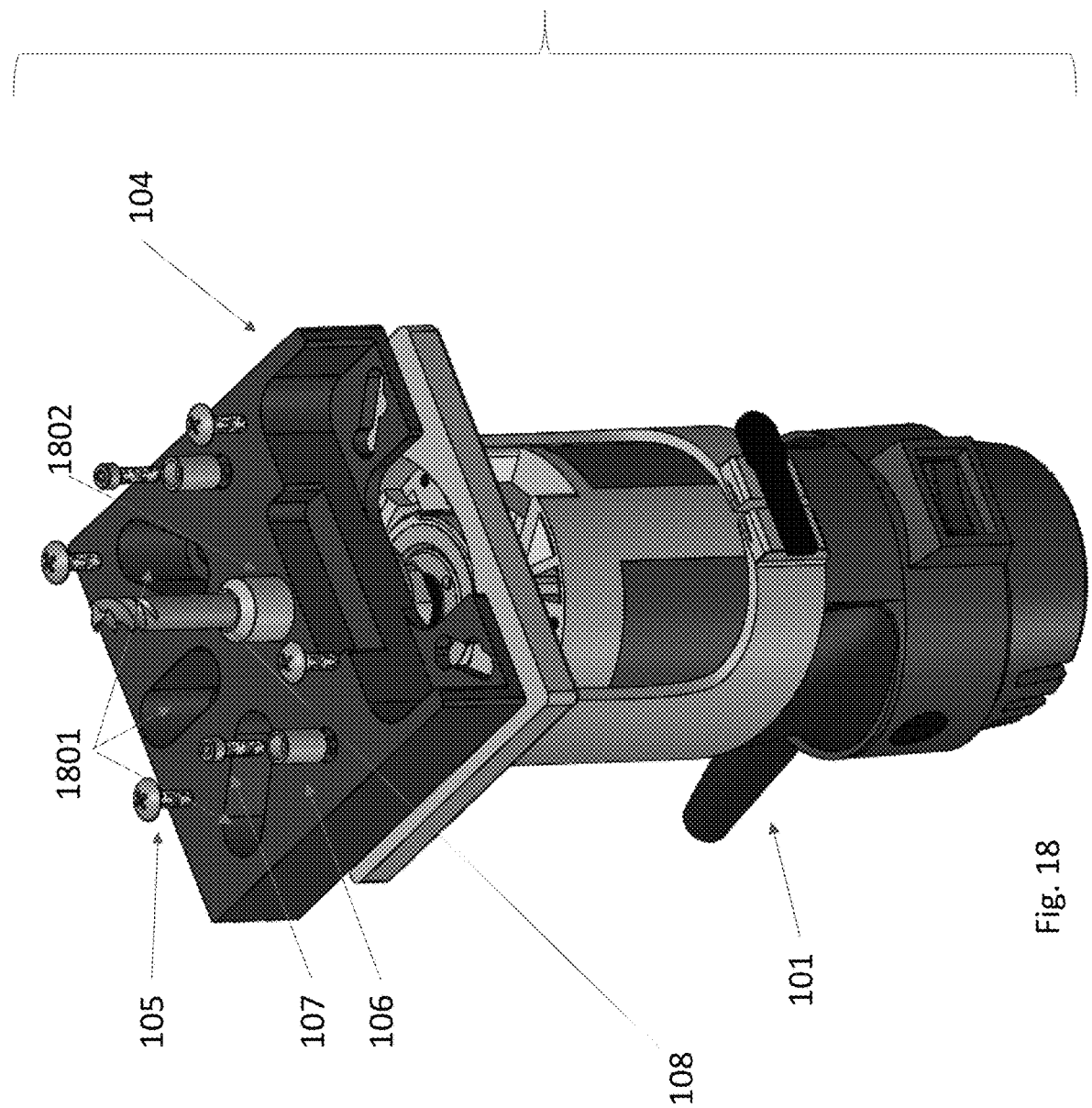
FIG. 18 is an exploded perspective view of the rotary power tool, rotary tool and adapter, according to an illustrative embodiment.

FIG. 18 is an exploded perspective view of the rotary power tool, rotary tool and adapter, according to an illustrative embodiment. The bottom surface of adapter 104 can include a plurality of wells 1801 of various sizes, angles and shapes disposed across the surface of the adapter 104. Adapter 104 can attach to rotary power tool 101 by inserting adapter screws 105 into their respective wells 1801 in the adapter 104 and tightening the adapter screws 105 into rotary power tool 101. The guide pins 106 can connect to the adapter 104 by inserting guide pin screw 107 through the guide pins 106 and tightened into the adapter 104. In various embodiments, one guide pin 106 can be used. In embodiments with a single guide pin 106, the guide pin 106 can be located near the rotary tool 108. One or more guide pins 106 can be attached to adapter 104 through various mechanical and chemical means including: thermal fit, press fit, screws, clamping, epoxies etc. Rotary tool 108 can pass through adapter 104. Adapter 104 can include rotary tool 1802 for rotary tool 108 to pass therethrough. In various embodiments a notch can be placed in adapter 104 so that rotary tool 108 can pass within the notch.

Figure 19:
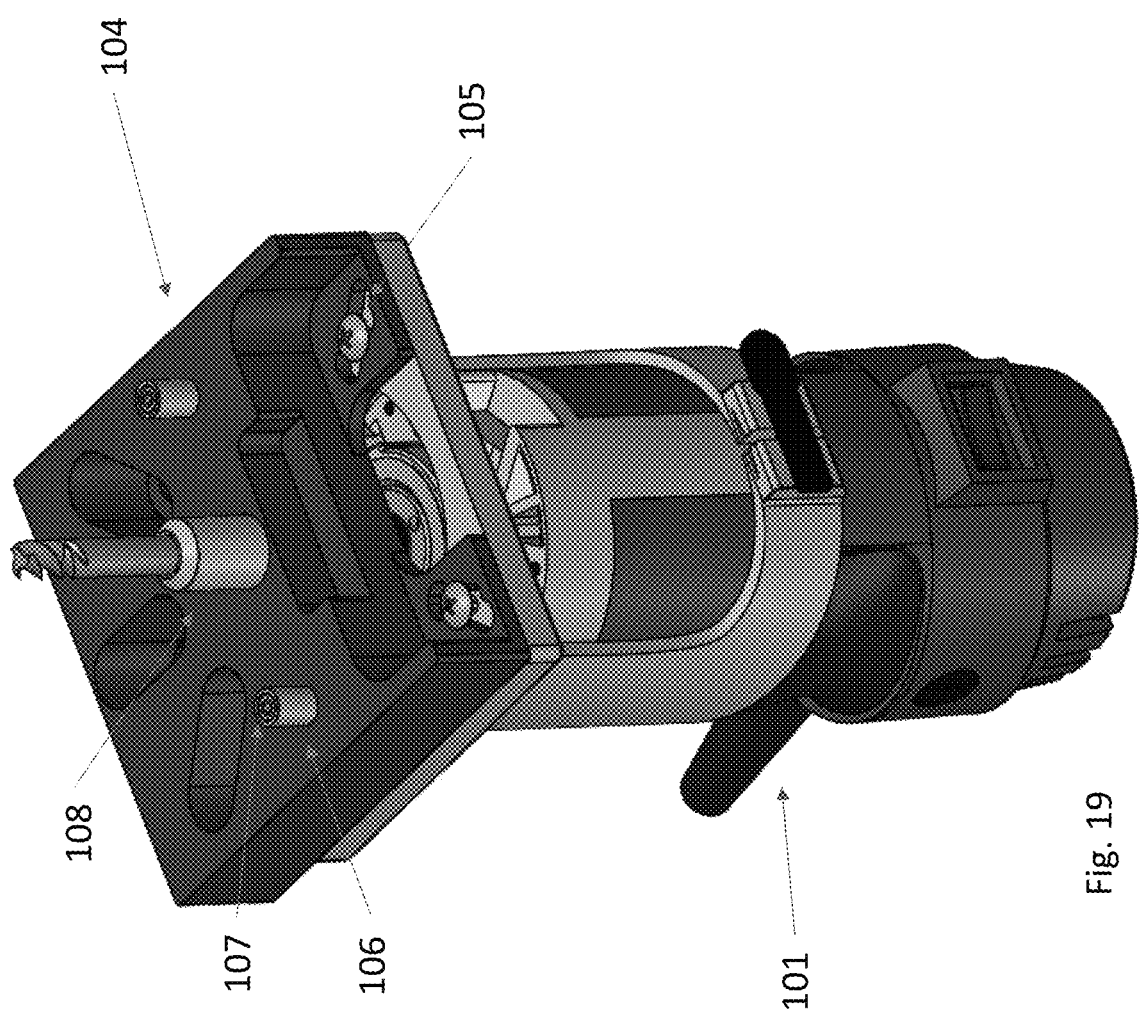
FIG. 19 is a perspective view of the rotary power tool, rotary tool and adapter, according to an illustrative embodiment.

FIG. 19 is an assembled perspective view of the rotary power tool, rotary tool, and adapter of FIG. 18, according to the illustrative embodiment. Adapter 104 can be attached to the rotary power tool with adapter screws 105. Guide pins can be attached to adapter 106 with guide pin screws 107. Rotary tool 108 can be attached to the rotary power tool 101, and rotary tool 108 can pass through adapter 104.

Figure 20:
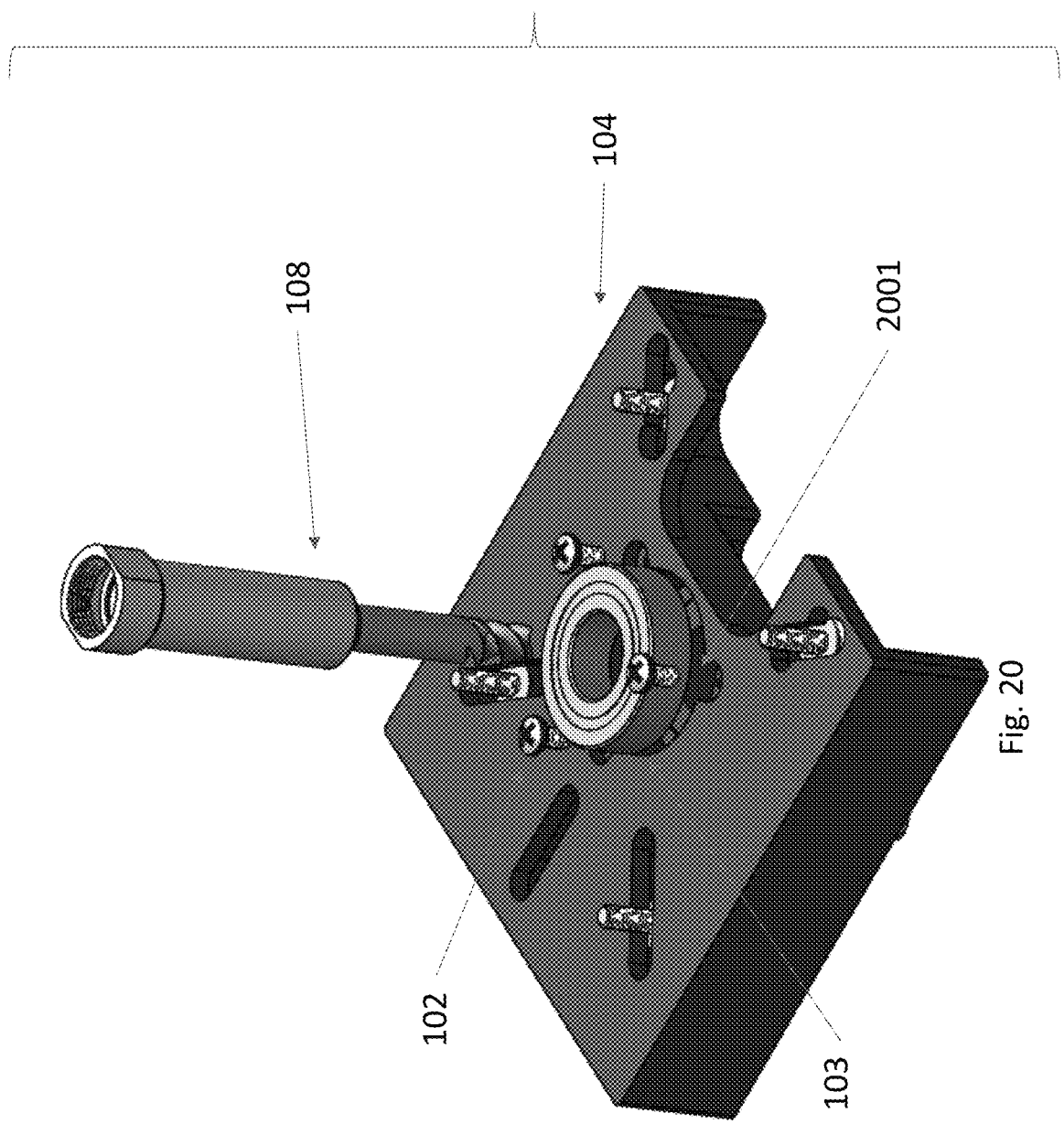
FIG. 20 is an exploded perspective view of the adapter and rotary tool, according to an illustrative embodiment.

FIG. 20 is an exploded perspective view of the adapter and rotary tool, according to an illustrative embodiment. Rotary power tool 101 has been omitted from FIG. 20 in order to provide a viewing angle showing the support bearing 103. Support bearing 103 can be engaged with adapter 104 to provide support for rotary power tool 108.

During finishing of a firearm lower receiver 113, the rotary tool is put into contact with the lower receiver 113. The rotary power tool 101 can be switched on to rotate the rotary power tool and rotary tool 108 in unison. The rotary tool 108 can be engaged with the lower receiver 113 and material can be removed from the lower receiver by the rotating rotary tool 108 to produce the necessary cavities, holes and pockets for functional operation of the lower receiver. Geometry within lower receiver 113 can require the length of rotary tool 108 to be long enough to produce undesirable effects such as chatter, poor surface finish and/or breakage of the rotary tool 108. Support bearing 103 can be engaged with adapter 104 to reduce the unsupported distance between the rotary power tool 101 attachment to rotary tool 108 and the location of material removal. The support bearing can reduce the deflection of the rotary tool 108, can improve quality, reduce finishing time, and reduce breakage. Support bearing 103 can be engaged with adapter 104 with bearing screws 102. Screws 102 can be inserted around the perimeter of bearing 103 to provide attachment to adapter 104. Adapter 104 can have a bearing hole 2001 on either side of the adapter 104 to support placement and location of bearing 103. Either side of adapter 104 can be applicable. In various embodiments, various mechanical and chemical methods can be used to insert, attach and/or locate bearing 103. For example; thermal fit, press fit, screws, adhesive, epoxies, etc.

Figure 21:
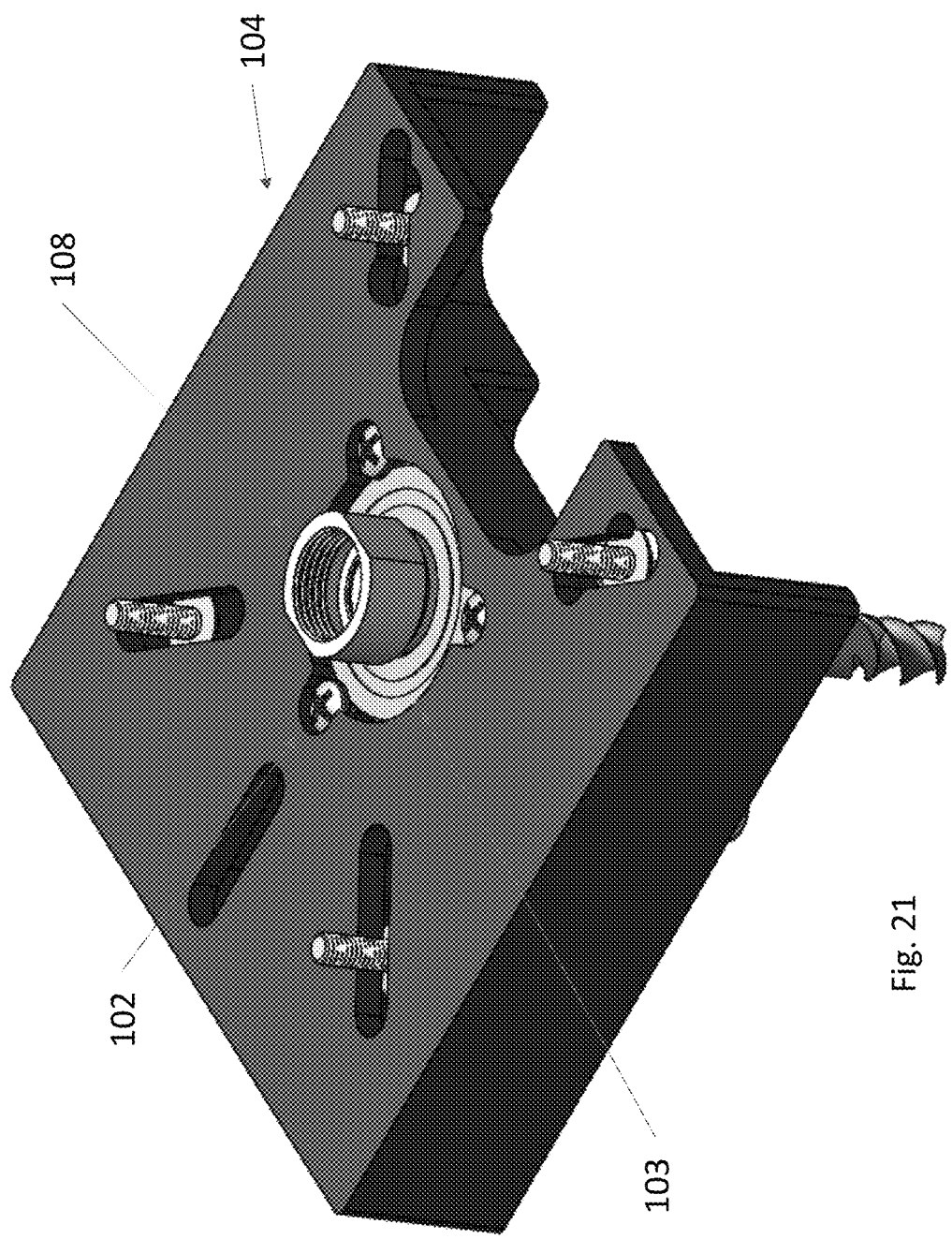
FIG. 21 is a perspective view of the adapter and rotary tool, according to an illustrative embodiment.

FIG. 21 is an assembled perspective view of the adapter and rotary tool, according to an illustrative embodiment. Rotary tool 108 can pass through bearing 103 and through adapter 104.

Figure 22:
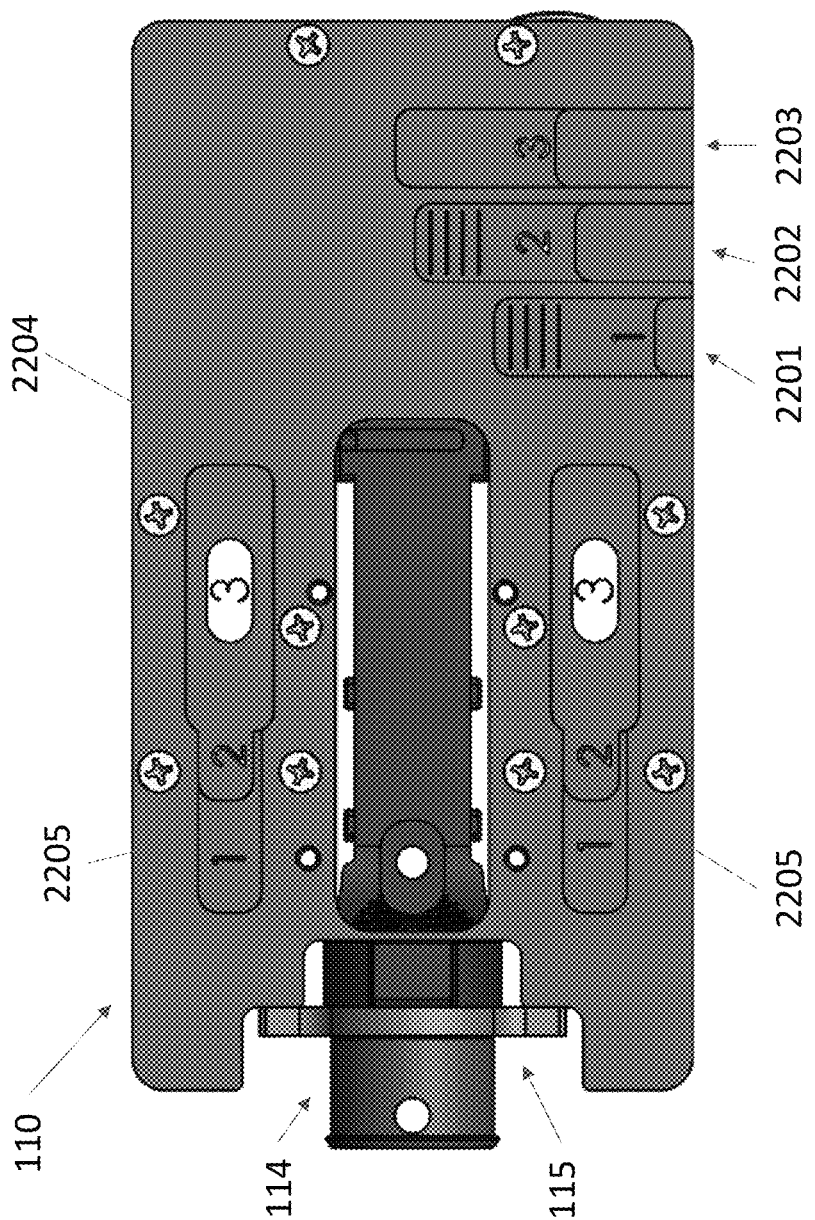
FIG. 22 is a top view of the AR15 firearm lower receiver and advance jig, according to an illustrative embodiment.

FIG. 22 is a top view of a firearm lower receiver and advanced jig, according to an illustrative embodiment. Adapter 104, rotary power tool 104 and components engaged thereto have been omitted from FIG. 22 to allow for a clear view of the top of guide plate 110. Guide plate 110 can include depth gauge cavities 2201, 2202 and 2203. Guide plate 110 can include guide pin cavities 2205. Guide plate 110 can include opening 2204. In operation, rotary tool 108 can pass through opening 2204 to interface with receiver 113. Depth gauge indices 2201, 2202 and 2203 can be used to assist with setting the length of protrusion of the rotary tool 108 through adapter 104. During use of the jig 100, the protrusion length of the rotary tool 108 can be set progressively longer using depth gauge indices 2201, 2202 and 2203 to step down through material in lower receiver 113. Guide pin cavities 2205 can be used to guide the rotary tool 108 within receiver 113 using guide pins 106. As previously described, the guide pins 106 can be attached to the adapter 104 which can be attached to rotary power tool 101 which can be engaged with rotary tool 108. Guide pins extend from the bottom of the adaptor 104, and the bottom of the guide pins can be placed within the guide pin cavities 2205, after the guide pins have been attached to the adaptor 104. Tracing guide pins 106 through the guide pin cavities 2205 can cause the rotary tool 108 to produce the shape of guide cavities 2205 onto receiver 113. In various embodiments, a single guide pin 106 could be engaged with adapter 104 and a single guide cavity could be located directly over receiver 113. In various embodiments, three or more guide pins could be engaged with adapter 104 and three or more guide cavities could be incorporated into guide plate 110. In various embodiments, guide cavities 2205 can be incorporated into guide plate 110 or guide cavities could be within a separate component attached to guide plate 110. In various embodiments, the guide pins could be adapted to engage with the guide plate 110 and the guide cavities could be adapted to be incorporated within the adapter. In practice, this could perform the same function inversely to the illustrated embodiment.

In operation, the user can place carriages 116 and 302 in a vise or other clamping device to hold steady. The protrusion depth of the rotary tool 108 can be set using indices 2201, 2202 and 2203. The protrusion depth of the rotary tool can be set by placing rotary tool 108 within the indices and aligning the rotary tool to the appropriate hash mark for the required milling step and moving the adapter 104 into contact with the edge of guide plate 110 therefore setting the protrusion depth to the appropriate hash mark relative to the bottom surface of adapter 104.

Figure 23:
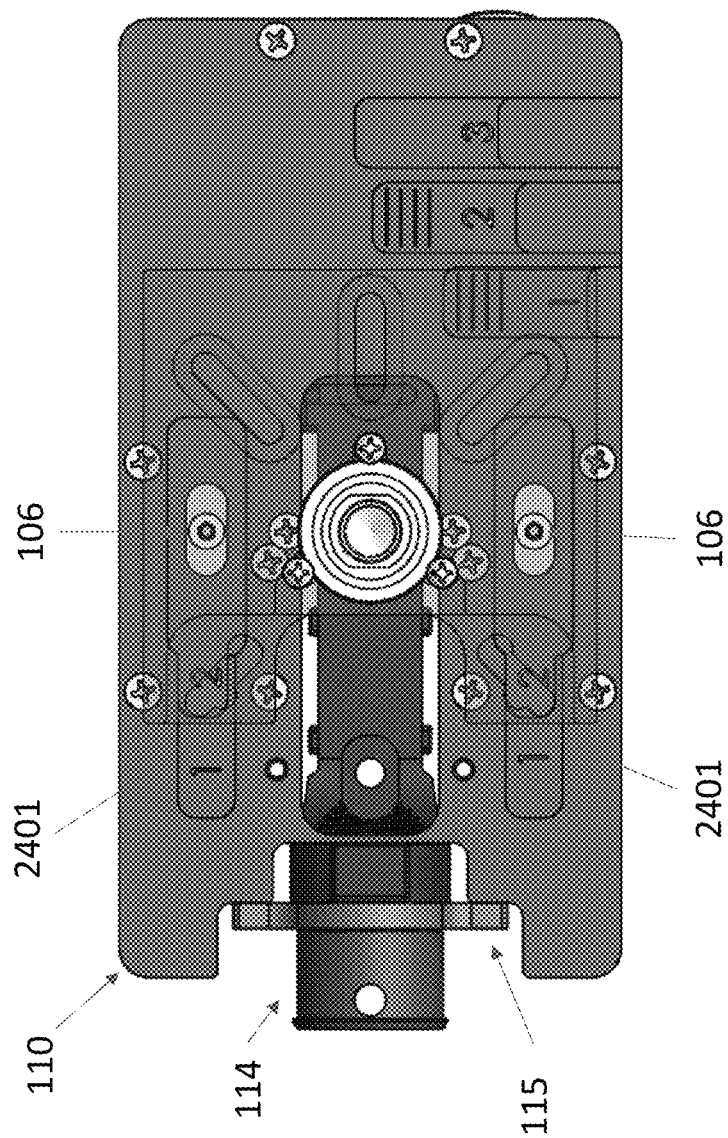
FIG. 23 is a top view of the AR15 firearm lower receiver and advanced jig, according to an illustrative embodiment.

FIG. 23 is a top view of the firearm lower receiver and advanced jig with an adaptor shown in phantom, according to an illustrative embodiment. Adapter 104 is shown in phantom to allow guide pins 106 to be shown within guide cavities 2205. In the embodiment, guide cavities 2205 can have three levels contained within the outline. The effective length of guide pins 106 can be altered by swapping the guide pins 106 to a different length. As the length of the guide pins 106 are extended the outline the guide pins 106 trace can change. This can allow for outlines within the outermost outline of guide cavities 2205 to be traced with different length guide pins 106. The functional length of the guide pins can be changed in various methods including; separate guide pins, spacers, bosses etc.

The assembled rotary power tool 101, adapter 104, rotary tool 108, and guide pins 106 can be engaged with the guide plate 110 and guide cavities 2205. The assembles can be placed atop each other with guide pins 106 within guide cavities 2205. The rotary power tool 101 can be switched on and rotary tool 108 can begin to rotate at a high rate of angular velocity. The rotary power tool 101 and adapter 104 can be moved along the guide plate 110. Guide pins 106 can contact the walls of the guide cavities 2205 guiding rotary tool 108 within receiver 113. This can be continued until guide pins 106 have been translated through guide cavities 2205 removing all the material that rotary tool 108 has contacted within the lower receiver 113. The rotary power tool 101 can be switched off and the rotary tool 108 can come to rest. The assembled rotary power tool 101, rotary tool 108, adapter 104, and guide pins 106 can be lifted from the guide plate 110. The rotary tool 108 can be placed back into indices 2201, 2202, or 2203 to adjust the protrusion depth of the rotary tool 108 to the next hash mark of the respective index. The protrusion depth can be set to the next setting. The rotary power tool 101, rotary tool 108, adapter 104 and guide pins 106 can be re-engaged with guide plate 110 and guide cavities 2205. The same procedure can be followed to remove the lower receiver 113 material with rotary tool 108. Chip material from receiver 113 can be removed periodically during finishing using a vacuum, air supply or by rotating the receiver and jig assembly upside down.

Figure 24:
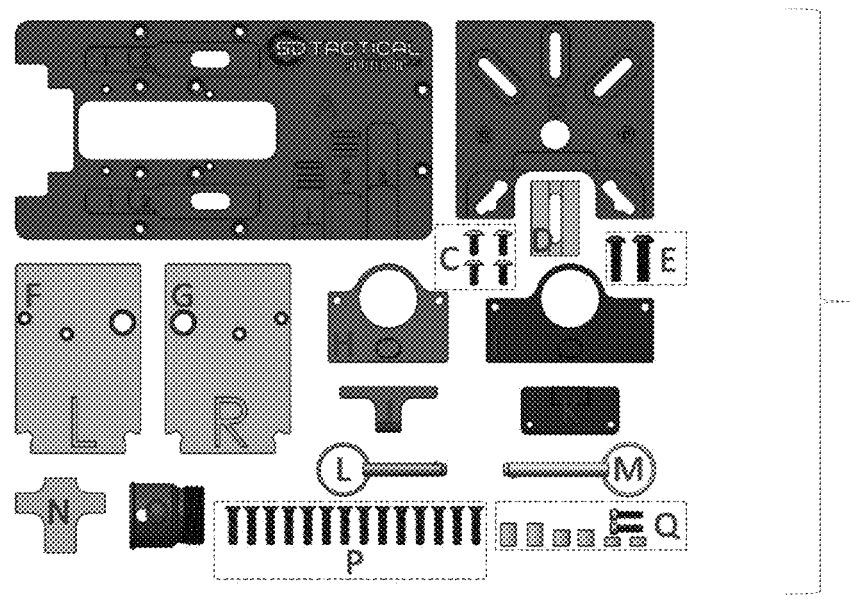
FIG. 24 depicts various components of a jig assembly with reference to FIGS. 25-32.

FIG. 24 depicts various components of a jig assembly with reference to FIGS. 25-32, as described below:

A. Guide Plate; B. Router Adapter; C. (4) Router Adapter Screws; D. Router Adapter Side Block; E. (2) Router Side Block Screws; F. Left Side Plate; G. Right Side Plate; H. AR-15/AR-9 Buffer Plate; I. .308/AR-10 Buffer Plate; J. AR-15/AR-9 Takedown Adapter; K. .308/AR-10 Takedown Adapter; L. AR-15/AR-9 Takedown Pin; M. .308/AR-10 Takedown Pin; N. Drill Guide; O. Buffer Adapter; P. (14) Jig Screws; and Q. Guide Pin Set.

Although not depicted in FIG. 24, tools for implementing the methods described herein are: 1. Router; 2. Drill; 3. 5D Tactical™ ReadyMILL™; 4. ⅜" Drill Bit; 5. ²¹⁄₆₄" Drill Bit; 6. ⁵⁄₃₂" Drill Bit; 7. Vise; 8. Shop Vac or Compressed Air; 9. #2 Phillips Screwdriver; 10. ⁷⁄₆₄" Allen Wrench; 11. Eye Protection; 12. Ear Protection; and 13. WD-40 or Cutting Fluid.

Figures 25A, 25B:
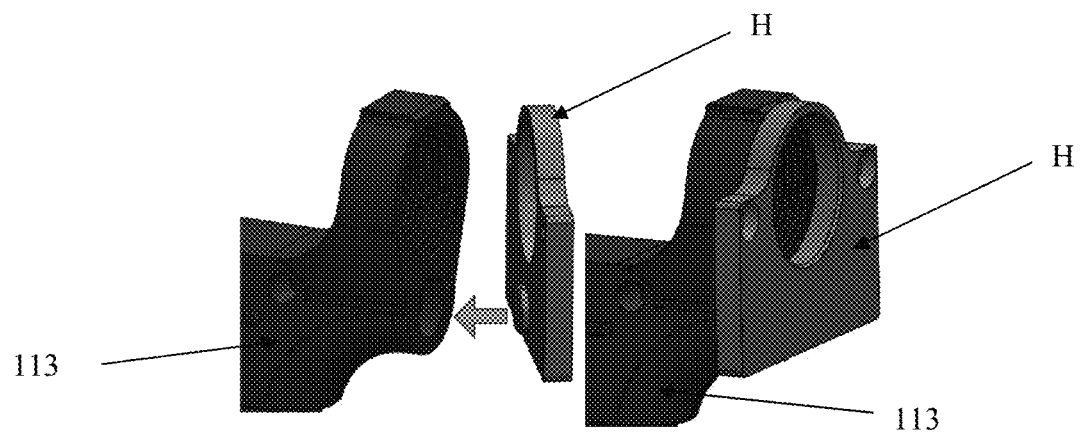
FIG. 25A depicts a step in a method of jig assembly according to one or more aspects of the disclosure.
FIG. 25B depicts a step in a method of jig assembly according to one or more aspects of the disclosure.
Figures 25C, 25D:
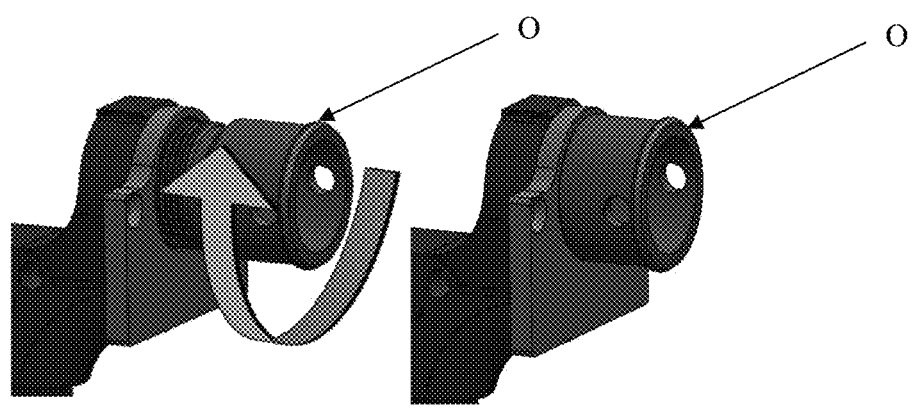
FIG. 25C depicts a step in a method of jig assembly according to one or more aspects of the disclosure.
FIG. 25D depicts a step in a method of jig assembly according to one or more aspects of the disclosure.
Figures 25E, 25F:
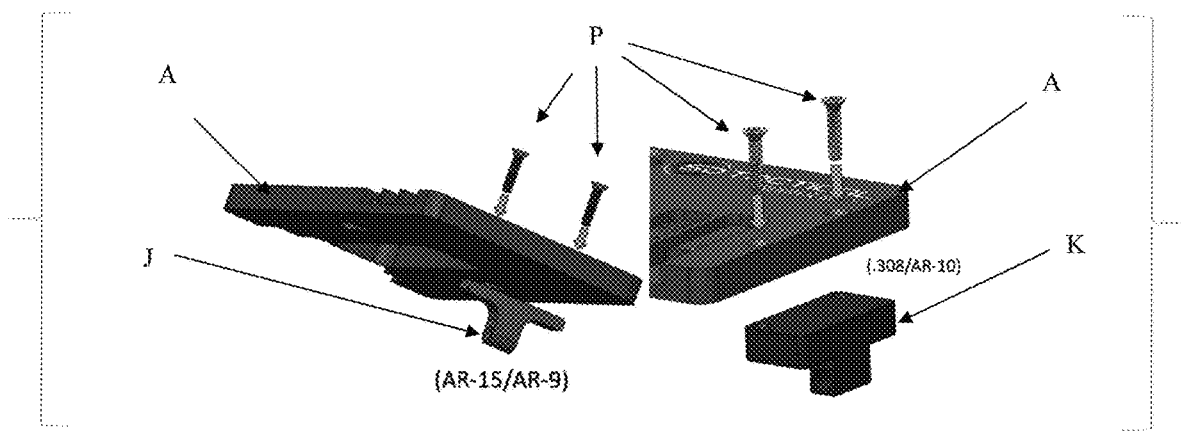
FIG. 25E depicts a step in a method of jig assembly according to one or more aspects of the disclosure.
FIG. 25F depicts a step in a method of jig assembly according to one or more aspects of the disclosure.
Figures 25G, 25H:
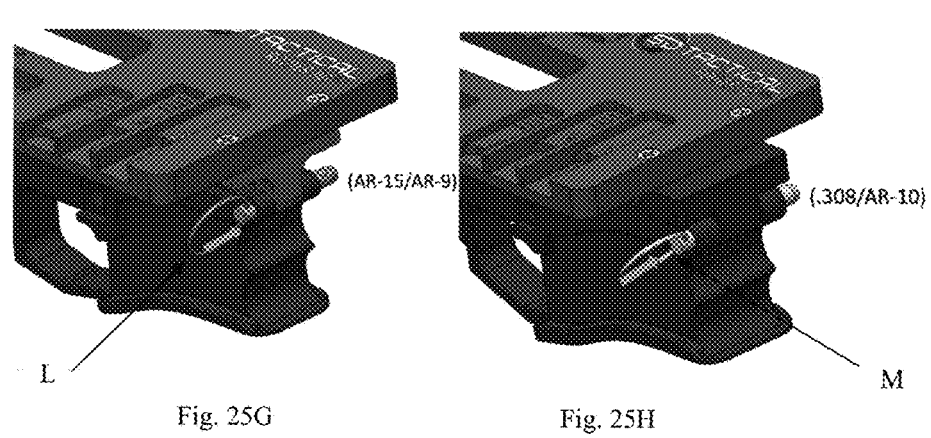
FIG. 25G depicts a step in a method of jig assembly according to one or more aspects of the disclosure.
FIG. 25H depicts a step in a method of jig assembly according to one or more aspects of the disclosure.
Figures 25I, 25J:
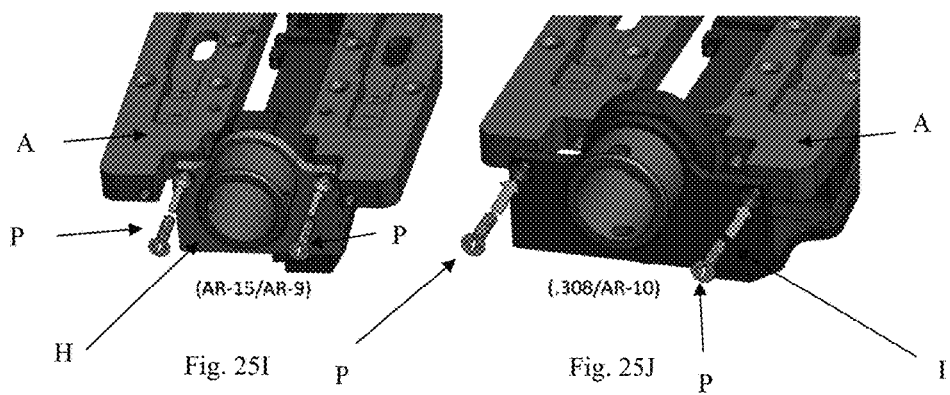
FIG. 25I depicts a step in a method of jig assembly according to one or more aspects of the disclosure.
FIG. 25J depicts a step in a method of jig assembly according to one or more aspects of the disclosure.
Figure 25K:
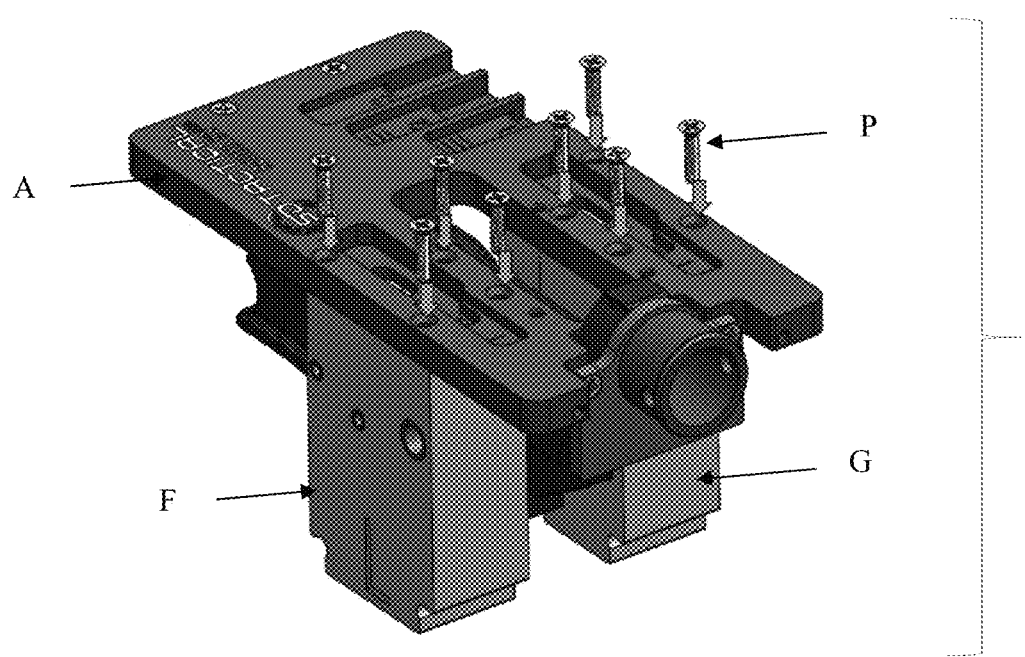
FIG. 25K depicts a step in a method of jig assembly according to one or more aspects of the disclosure.
Figure 25L:
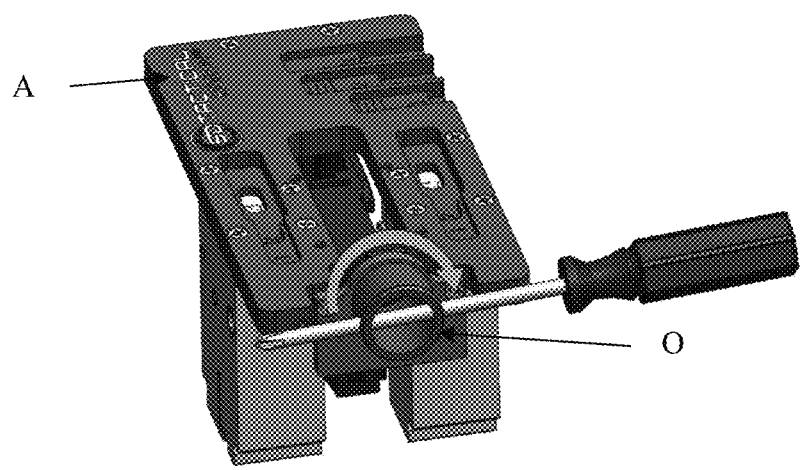
FIG. 25L depicts a step in a method of jig assembly according to one or more aspects of the disclosure.
Figure 25M:
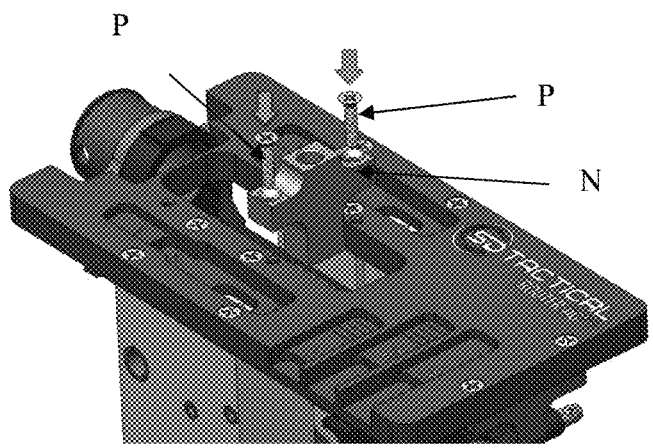
FIG. 25M depicts a step in a method of jig assembly according to one or more aspects of the disclosure.
Figures 25N, 25O:
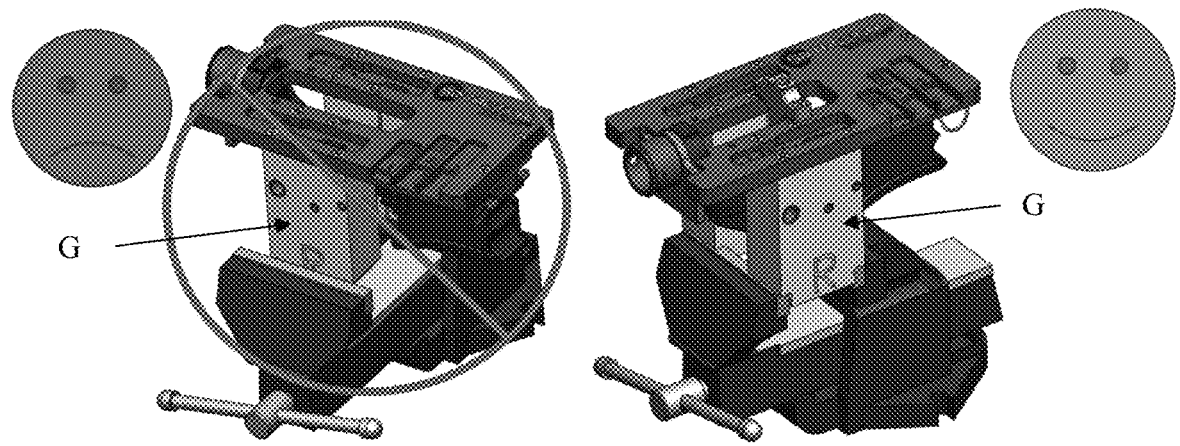
FIG. 25N depicts a step in a method of jig assembly according to one or more aspects of the disclosure.
FIG. 25O depicts a step in a method of jig assembly according to one or more aspects of the disclosure.

With reference to FIGS. 25A-25O, a method of jig assembly is described below.

To begin, a user can clean a surface of the 80% receiver and apply masking tapes to the sides.

With reference to FIGS. 25A-25B, apply the Buffer Plate (H, I) to the back of the receiver (113) as shown. Use grey Buffer Plate (H) for AR-15/AR-9 receivers and black Buffer Plate (I) for 0.308/AR-10 receivers.

With reference to FIGS. 25C-25D, loosely thread the Buffer Adapter (O) into the receiver until the Buffer Plate (O) is pressed against the back of the receiver.

With reference to FIGS. 25E-25F, loosely install the Takedown Adapter (J, K) to the Guide Plate (A) using (2) Jig Screws (P). Use grey Takedown Adapter (J) for AR-15/AR-9 receivers and black Takedown Adapter (K) for 0.308/AR-10 receivers.

With reference to FIGS. 25G-25H, align the receiver with the Takedown Adapter, pass the Takedown Pin (L, M) through the receiver and adapter. Use the correct Takedown Pin (L, M) for the receiver.

With reference to FIGS. 25I-25J, align the Buffer Plate (H, I) with the holes in the rear of the Guide Plate (A). Loosely install (2) Jig Screws (P).

While grasping Guide Plate (A), tighten (4) Jig screws (P), securing Buffer Plate (H, I) and Takedown Adapter (J, K).

With reference to FIG. 25K, orient Side Plates (F, G), observing Left (F) and Right (G) with flat sides facing out. Set Guide Plate (A) and receiver assembly atop Side Plates. Loosely thread (8) Jig Screws (P) and then tighten.

With reference to FIG. 25L, while grasping Guide Plate (A), pass Phillips screwdriver through the hole in the Buffer Adapter (O), and tighten. Periodically check for tightness during jig use.

With reference to FIG. 25M, install the Drill Guide (N) as shown. Loosely insert (2) Jig Screws (P), then tighten.

With reference to FIGS. 25N-25O, clamp Jig Assembly securely in a vise as shown by the notches provided in the Side Plates (F, G). Do not clamp jig by outside of side plates.

Figure 26A:
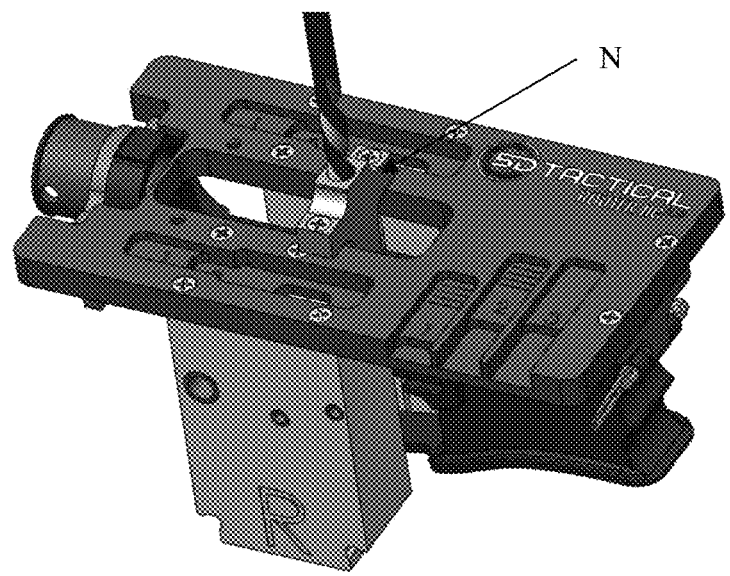
FIG. 26A depicts a step in a method of drilling according to one or more aspects of the disclosure.
Figure 26B:
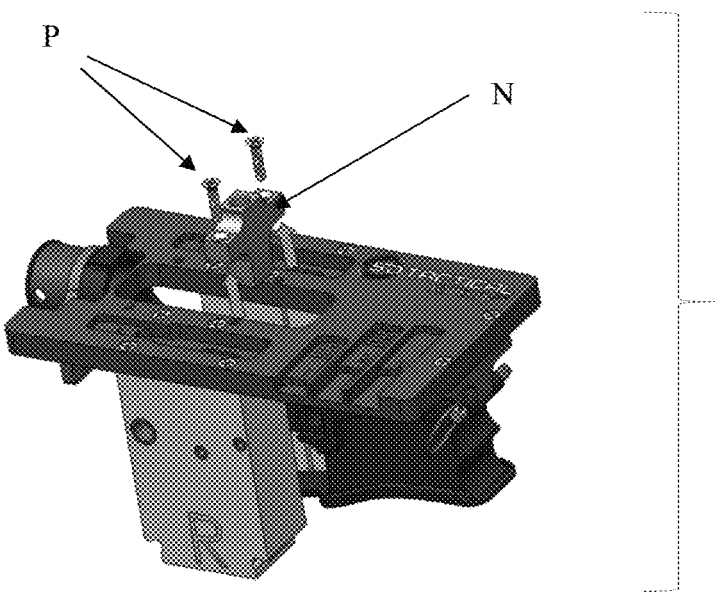
FIG. 26B depicts a step in a method of drilling according to one or more aspects of the disclosure.

With reference to FIGS. 26A-26B, a method of drilling is described below.

With reference to FIG. 26A, spray WD-40 into Drill Guide (N) hole and Insert ²¹⁄₆₄" drill bit. Do not start the drill until the bit is fully inserted. Using care to keep the drill bit straight and perpendicular to the receiver, begin drilling. Periodically pull the drill bit out of the Guide (N) to clear chips. Apply WD-40 liberally. Drill until the bit exists the bottom of the receiver.

With reference to FIG. 26B, uninstall the Drill Guide (N) by removing the (2) Jig Screws (P).

With reference to FIGS. 27A-27H, a method of milling is described below.

Ensure that the router base lock is tight after each milling step. If the router depth moves while milling, the end mill and/or receiver can be damaged.

Set the router to the highest speed setting. Do not insert or remove the end mill while the router is spinning.

Figure 27A:
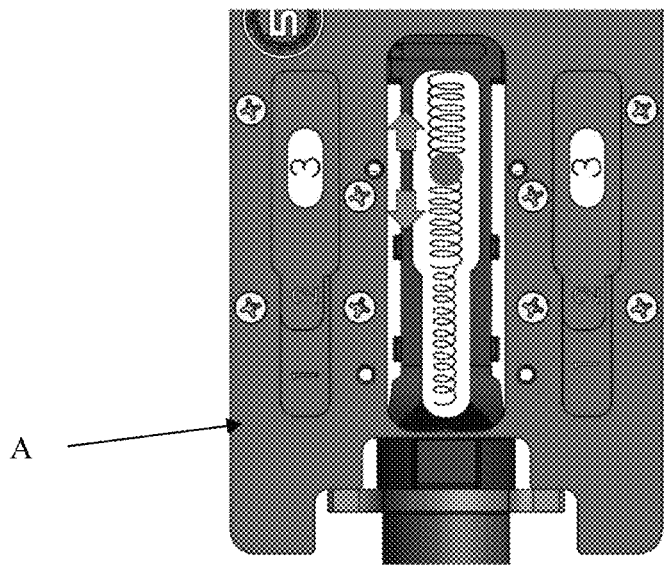
FIG. 27A depicts a step in a method of milling according to one or more aspects of the disclosure.

Hold firmly and apply moderate downward pressure. Move the router smoothly in a clockwise manner as shown in FIG. 27A, keeping the Router Adapter flat against the Guide Plate (A). Avoid abruptly pulling the router or exerting excessive force. Slowly nibble away at the receiver. If you begin to experience chattering, slow down and/or take shallower passes. Apply WD-40 or cutting fluid liberally while milling. Remove chips frequently. Attempting to take depth increments higher than recommended can cause damage to the end mill and/or receiver.

Beginners and those seeking maximum finish quality should take less than a full hash mark during milling.

Figure 27B:
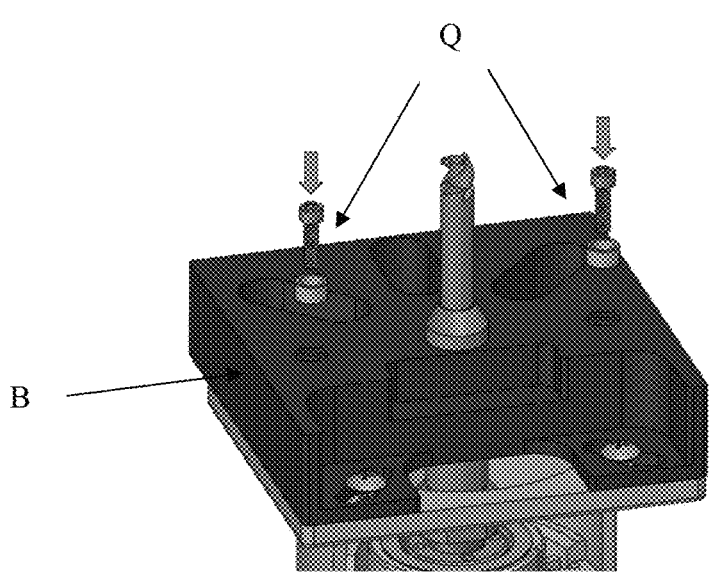
FIG. 27B depicts a step in a method of milling according to one or more aspects of the disclosure.

With reference to FIG. 27B, install #1 (Short) Guide Pins (Q) to Router Adapter (B) using (2) Guide Pin Screws (Q) and ⁷⁄₆₄" Allen Wrench. Open end of pins should be facing up. Do not overtighten. Make sure pins are fully seated.

Figure 27C:
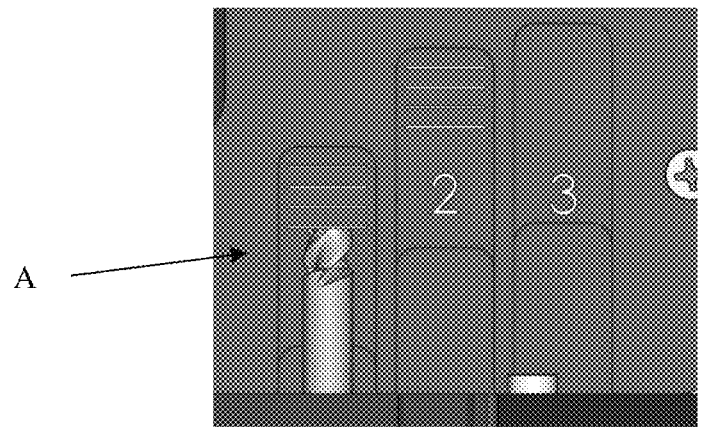
FIG. 27C depicts a step in a method of milling according to one or more aspects of the disclosure.

With reference to FIG. 27C, set end mill depth to the first hash mark using Depth Gauge #1. Set depth by holding the base of Router Adapter against the edge of the Guide Plate (A). Be sure Guide Pins are not between the Adapter and Guide Plate. Make sure router depth adjustment is locked after each depth setting.

Figure 27D:
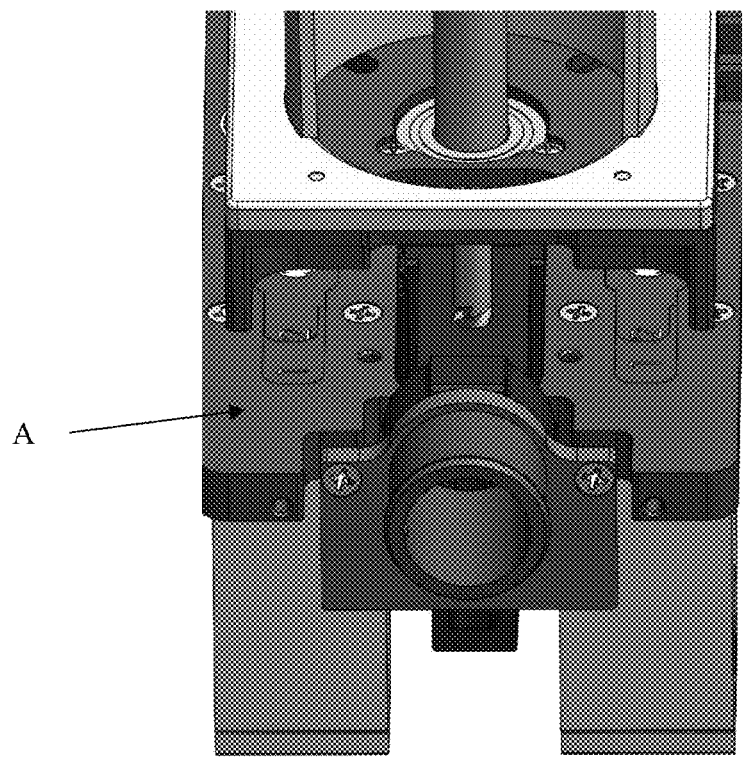
FIG. 27D depicts a step in a method of milling according to one or more aspects of the disclosure.

With reference to FIG. 27D, orient Jig so the buffer extension is closest to the user. Place router on Guide Plate (A), with the end mill centered within the drill hole. The Guide Pins should be positioned inside the #1 Guide Cavities on both sides. Hold firmly, turn router on and mill using consistent pressure and speed, moving in a clockwise manner.

Figure 27E:
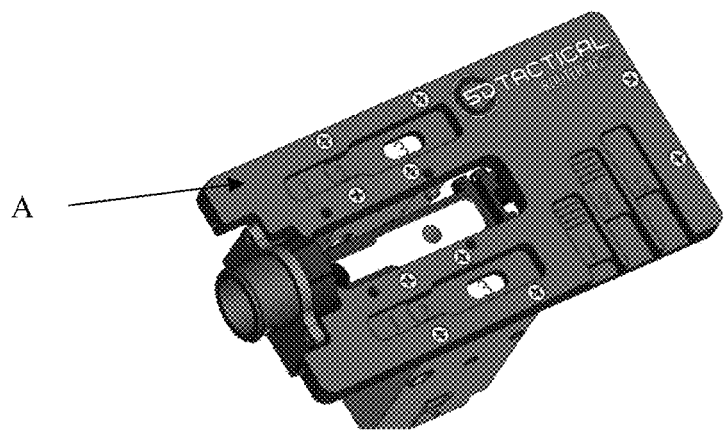
FIG. 27E depicts a step in a method of milling according to one or more aspects of the disclosure.

With reference to FIG. 27E, complete the first pass of milling, allowing the Guide Pins to trace the entire are of the Guide Cavities.

Figure 27F:
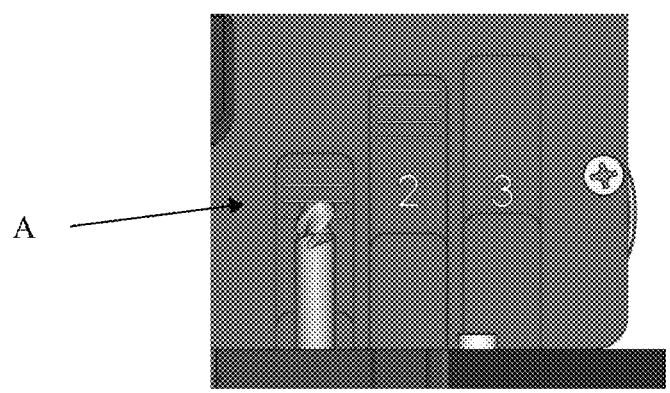
FIG. 27F depicts a step in a method of milling according to one or more aspects of the disclosure.

With reference to FIG. 27F, set end mill depth to the second hash mark.

Mill second pass following the same method and process as outlined in with respect to FIGS. 27D and 27E.

Figure 27G:
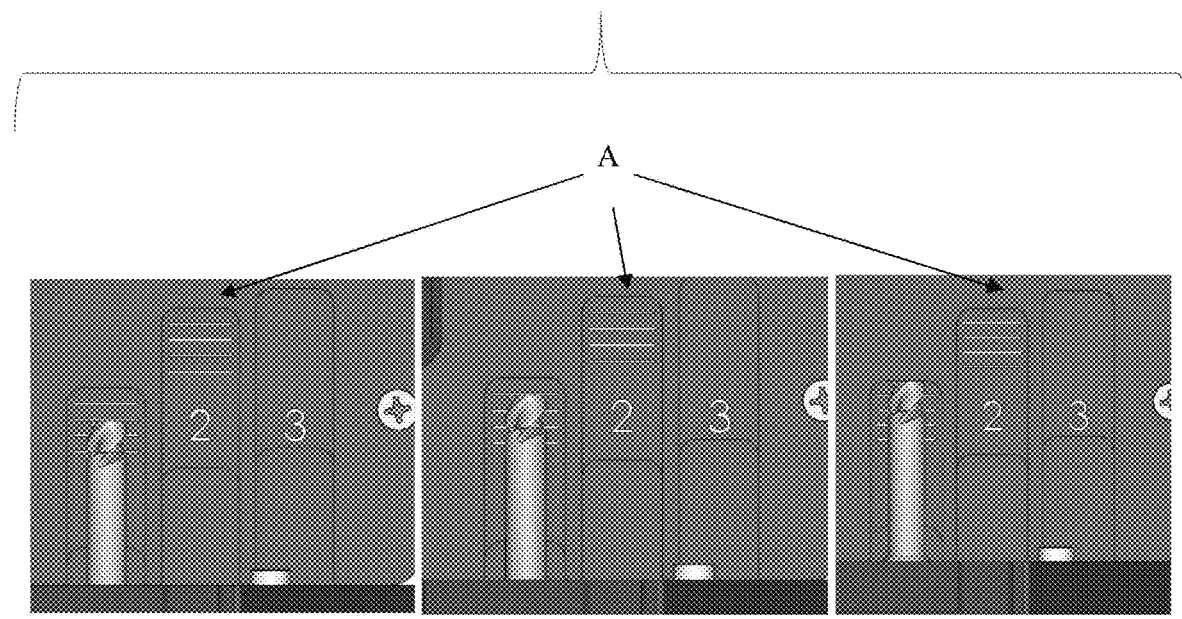
FIG. 27G depicts a step in a method of milling according to one or more aspects of the disclosure.
Figure 27H:
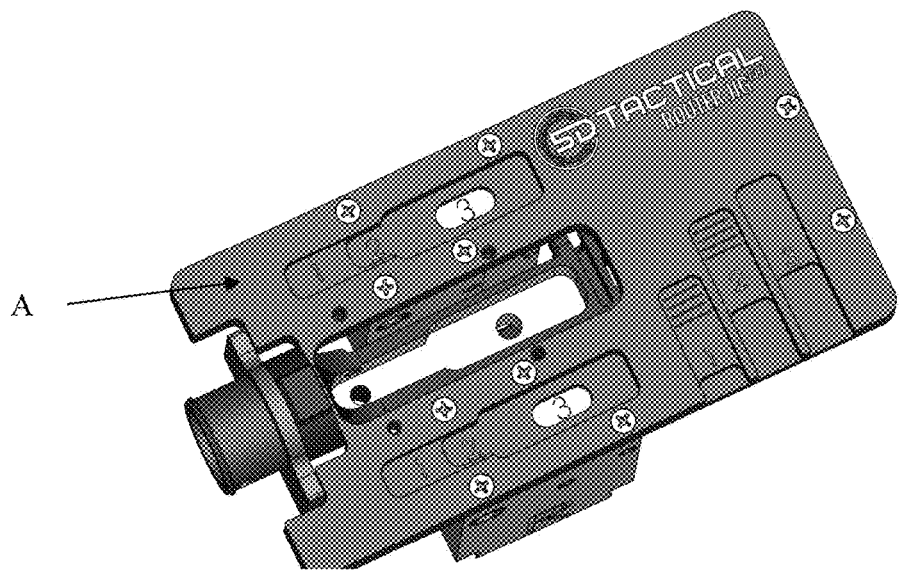
FIG. 27H depicts a step in a method of milling according to one or more aspects of the disclosure.

With reference to FIG. 27G, continue milling in this manner, adjusting end mill depth 1 hash mark per pass until you have milled to the bottom of Depth Gauge #1. Stop—before continuing to Depth Gauge #2, the #2 (Medium) Guide Pins must be installed. See FIG. 27H for resulting progress.

With reference to FIGS. 28A-28F, a method of milling is described below.

Figure 28A:
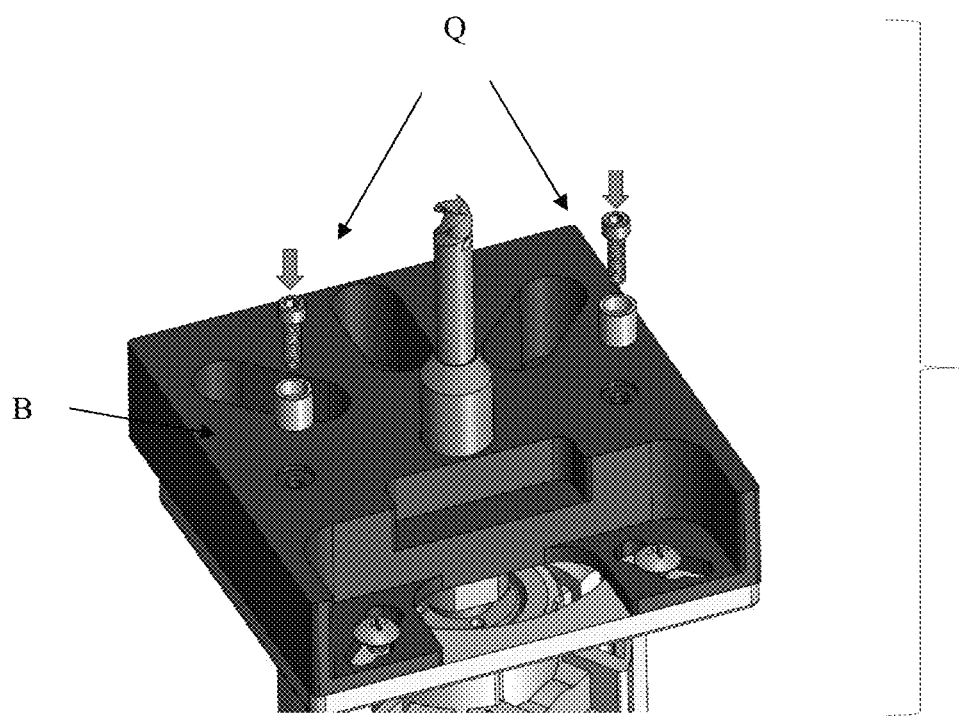
FIG. 28A depicts a step in a method of milling according to one or more aspects of the disclosure.

With reference to FIG. 28A, remove #1 (Short) Guide Pins and install #2 (Medium) Guide Pins. Do not overtighten.

Figure 28B:
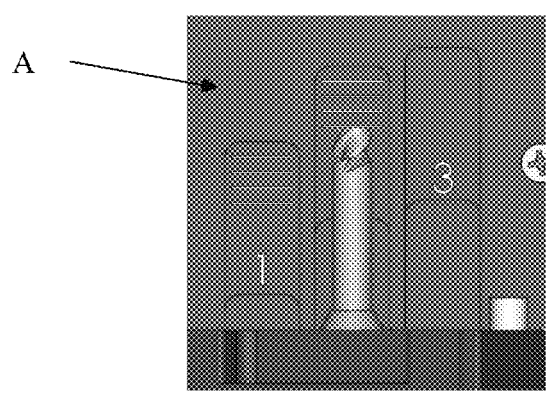
FIG. 28B depicts a step in a method of milling according to one or more aspects of the disclosure.

With reference to FIG. 28B, set end mill depth to the first hash mark using Depth Gauge #2.

Figure 28C:
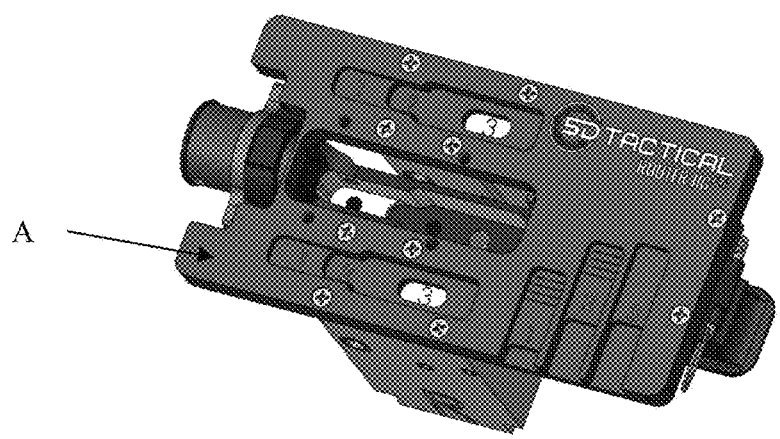
FIG. 28C depicts a step in a method of milling according to one or more aspects of the disclosure.

With reference to FIG. 28C, complete the first milling pass allowing the Guide Pins to follow the #2 Guide Cavities.

Figure 28D:
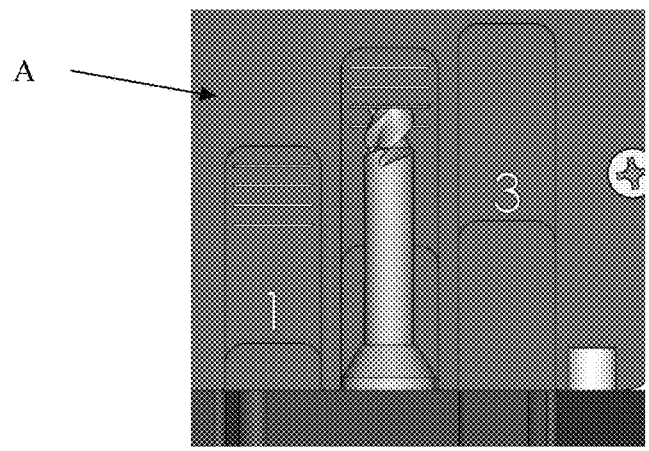
FIG. 28D depicts a step in a method of milling according to one or more aspects of the disclosure.

With reference to FIG. 28D, set end mill depth to the second hash mark.

Mill second pass following the same method and process.

Figure 28E:
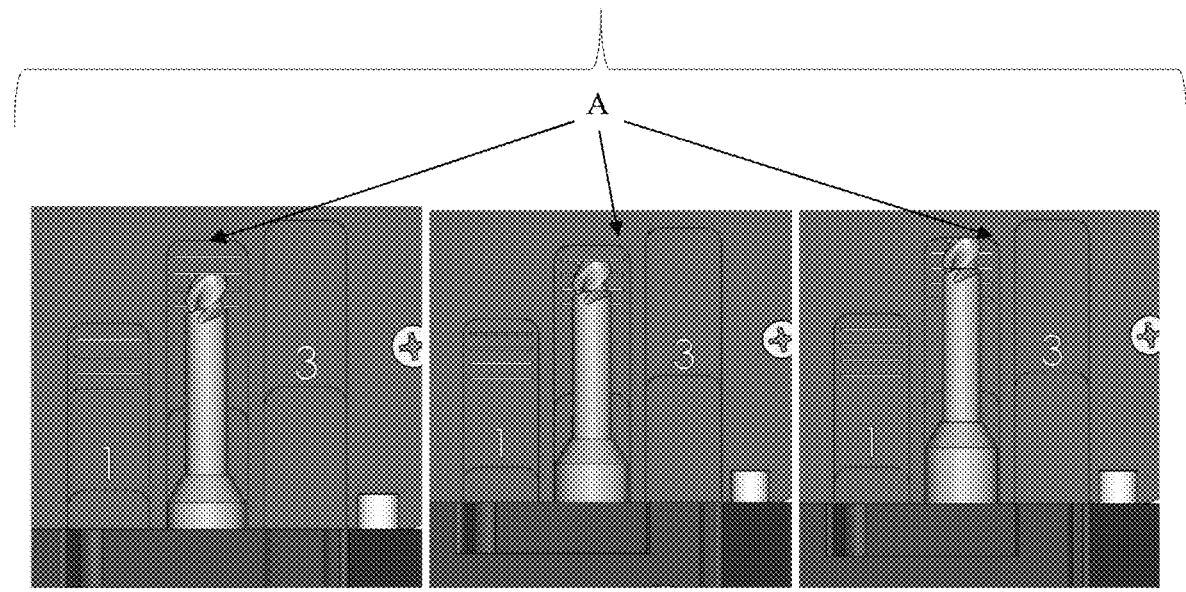
FIG. 28E depicts a step in a method of milling according to one or more aspects of the disclosure.
Figure 28F:
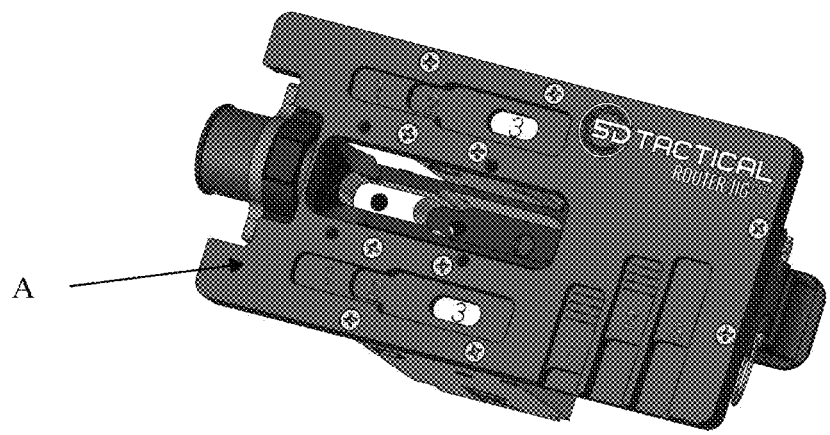
FIG. 28F depicts a step in a method of milling according to one or more aspects of the disclosure.

With reference to FIG. 28E, continue milling, adjusting depth by 1 hash mark until you have milled to the bottom of Depth Gauge #2. Stop—before continuing to Depth Gauge #3, the #3 (Long) Guide Pins must be installed. See FIG. 28F for resulting progress.

Figure 29A:
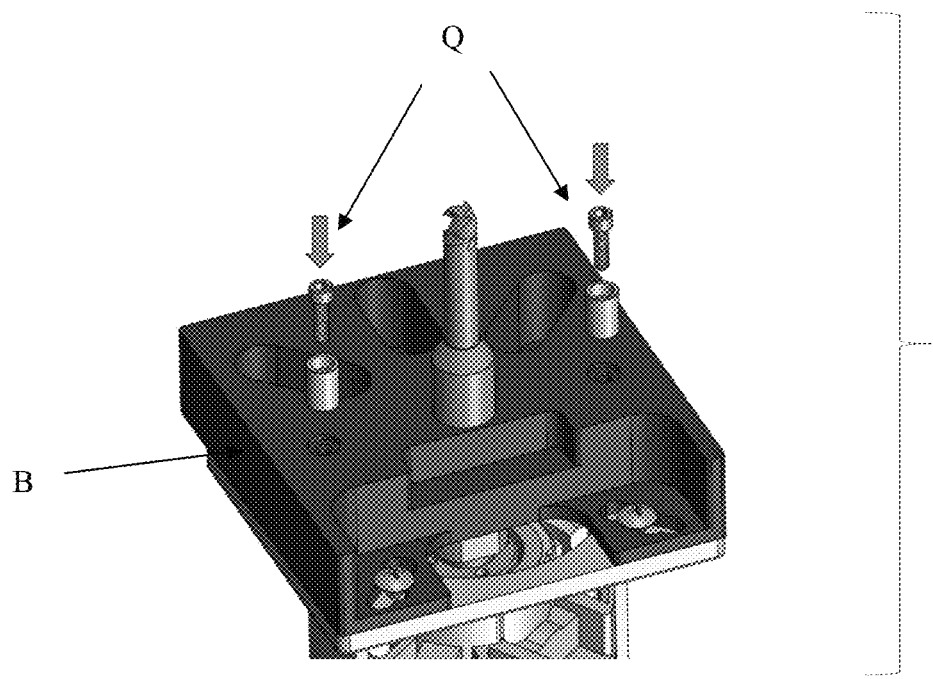
FIG. 29A depicts a step in a method of milling according to one or more aspects of the disclosure.
Figure 29B:
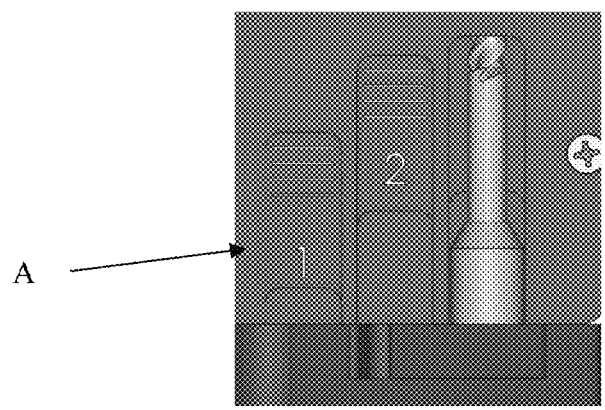
FIG. 29B depicts a step in a method of milling according to one or more aspects of the disclosure.
Figure 29C:
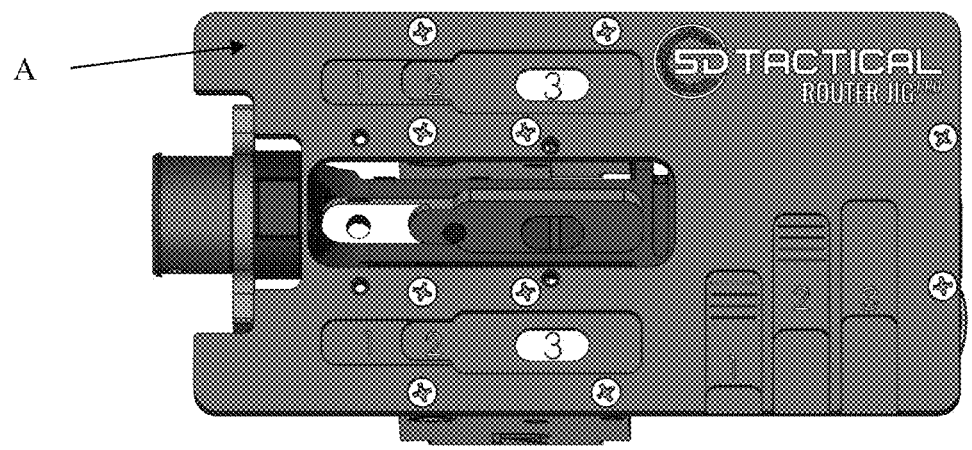
FIG. 29C depicts a step in a method of milling according to one or more aspects of the disclosure.

With reference to FIGS. 29A-29C, a method of milling is described below.

With reference to FIG. 29A, remove #2 (Medium) Guide Pins and install #3 (Long) Guide Pins (Q). Do not overtighten.

With reference to FIG. 29B, set end mill depth to bottom of Depth Gauge #3.

With reference to FIG. 29C, place router on Guide Plate, with the end mill centered within the drill hole. The Guide Pins should be positioned inside the #3 Guide Holes on both sides. Gently mill in a clockwise manner until the trigger slot if formed.

Figure 30A:
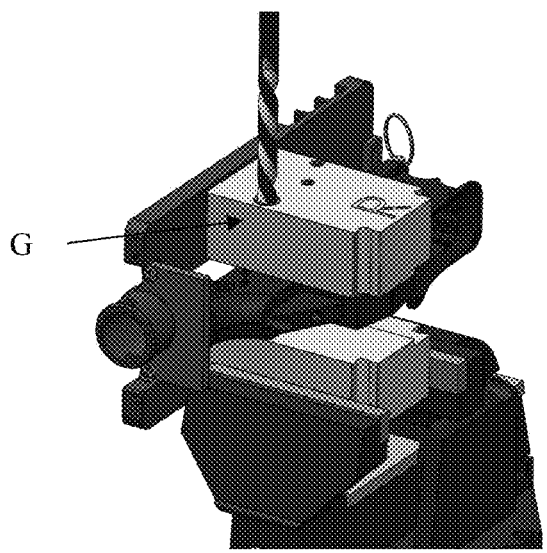
FIG. 30A depicts a step in a method of drilling according to one or more aspects of the disclosure.
Figure 30B:
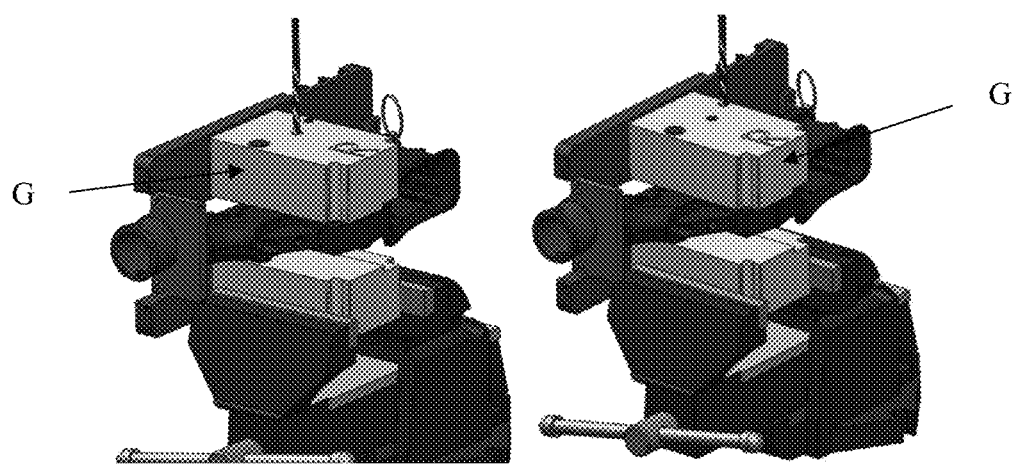
FIG. 30B depicts a step in a method of drilling according to one or more aspects of the disclosure.

With reference to FIGS. 30A-30B, a method of drilling is described below.

With reference to FIG. 30A, clamp Jig Assembly in the Vise by the edges of the side plates (F, G), with the RIGHT Side Plate (G) facing up. Ensure that the assembly is level. Spray WD-40 into the large Guide Hole and insert ⅜" drill bit. Do not start drill until bit is fully inserted in the Guide Hole. Apply moderate pressure and drill until the bit penetrates the right side wall and continue drilling through left side wall.

With reference to FIG. 30B, spray WD-40 into both small Guide Holes and insert 5/32" drill bit into either remaining Guide Hole. Do not start drill until bit is fully inserted. Apply moderate pressure and drill until the bit penetrates the right side wall and continue drilling through left side wall. Repeat for remaining small Guide Hole.

Note: If your drill bits are not long enough to penetrate both walls, flip jig over and repeat process. Receivers with spray-on coatings such as Cerakote and Duracoat should be drilled from both sides for maximum finish quality.

Figure 31A:
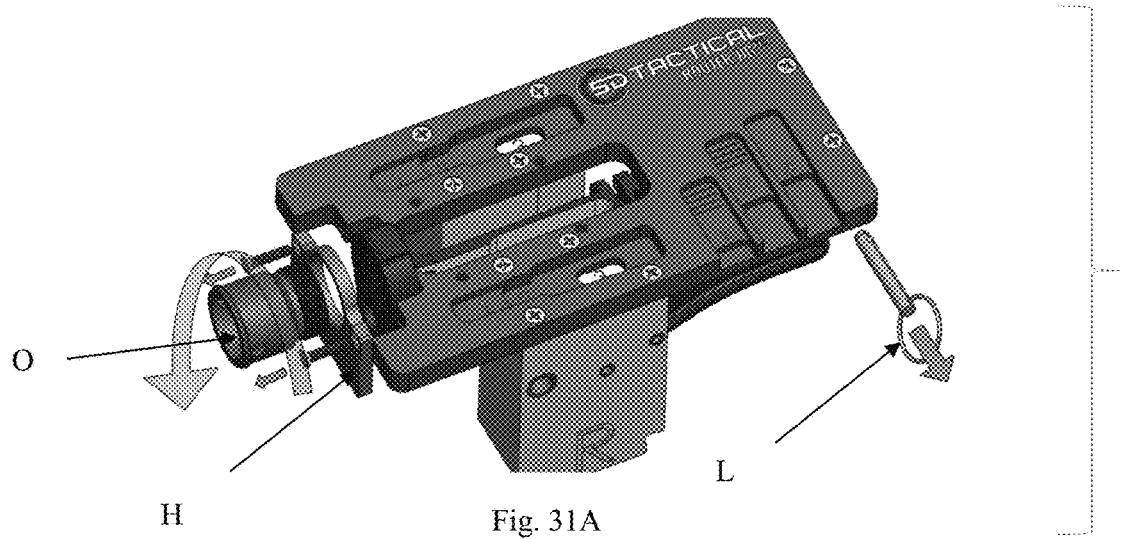
FIG. 31A depicts a step in a method of disassembly according to one or more aspects of the disclosure.
Figure 31B:
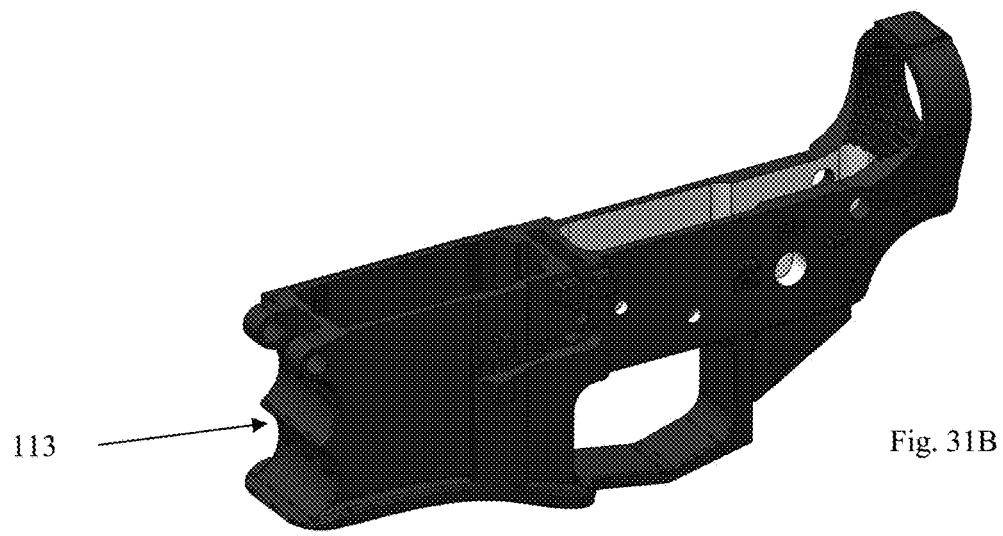
FIG. 31B depicts a step in a method of disassembly according to one or more aspects of the disclosure.
Figure 31C:
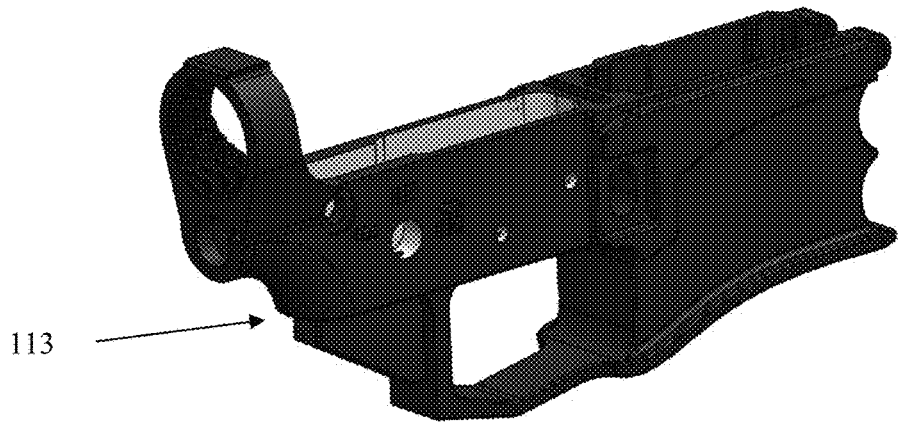
FIG. 31C depicts a step in a method of disassembly according to one or more aspects of the disclosure.

With reference to FIGS. 31A-31C, a method of disassembly is described below.

With reference to FIG. 31A, remove Buffer Adapter (0). Loosen or completely remove Buffer Plate (H, I). Remove Takedown Pin (L, M). The finished receiver can now be removed from the jig. See FIGS. 31B-31C for resulting progress.

With reference to FIGS. 32A-32F, a method of router adapter installation is described below.

Reference is made to FIG. 32A for specific instructions on how to install the Router Adapter to your router model.

Before proceeding, check that your router depth lock is fully functional. If necessary, tighten router depth lock. On most models, a nut or setscrew can be tightened to adjust the tension of the depth lock. If your router depth moves while milling, damage to the receiver and/or end mill may occur.

Figures 32B, 32C:
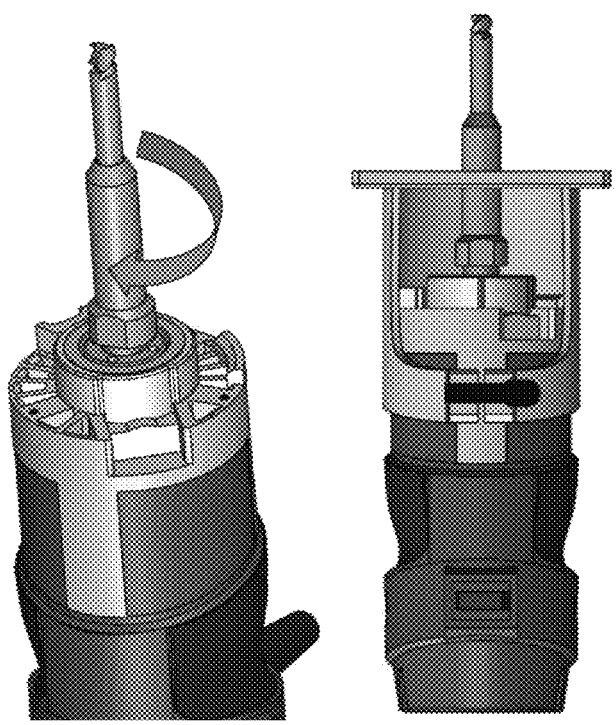
FIG. 32B depicts a step in a method router adapter installation according to one or more aspects of the disclosure.
FIG. 32C depicts a step in a method router adapter installation according to one or more aspects of the disclosure.

With reference to FIGS. 32B-32C, prepare your router for milling by installing the ReadyMill™. Unplug your router. Remove the base from the router. Remove the collet. Thread on ReadyMill™ and tighten using a wrench. Reinstall the router base.

Figure 32D:
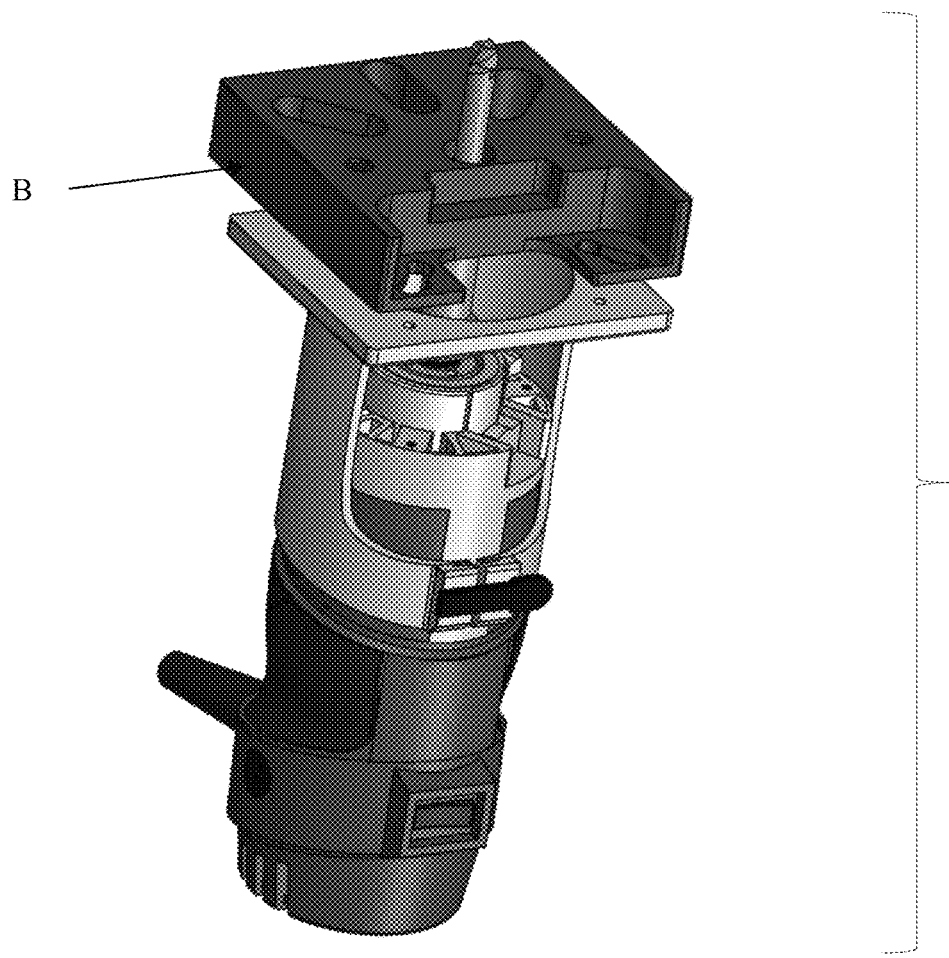
FIG. 32D depicts a step in a method router adapter installation according to one or more aspects of the disclosure.

With reference to FIG. 32D, orient the Router Adapter (B) with the bearing facing toward the router, and the notch away from the power cord. Pass the large diameter portion of the ReadyMill™ through the bearing to center the Router Adapter (B) with the Router.

Figure 32E:
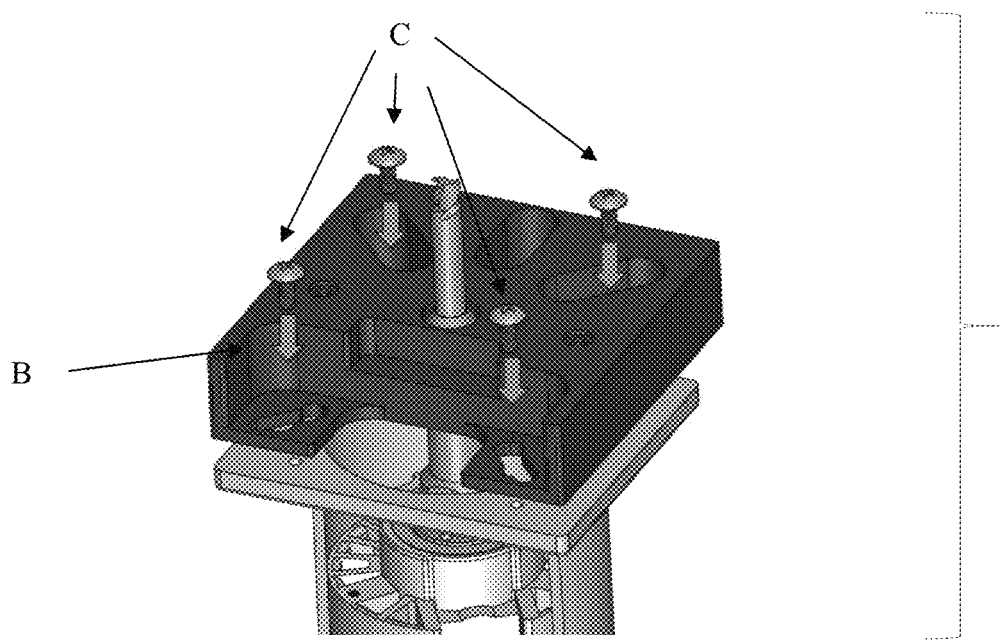
FIG. 32E depicts a step in a method router adapter installation according to one or more aspects of the disclosure.

FIG. 32E generally depicts a first Installation Method. With the Adapter (B) flat against router base, align Router Adapter (B) with 4 screw holes in router base, loosely install (4) Router Adapter Screws (C), then tighten.

Figure 32F:
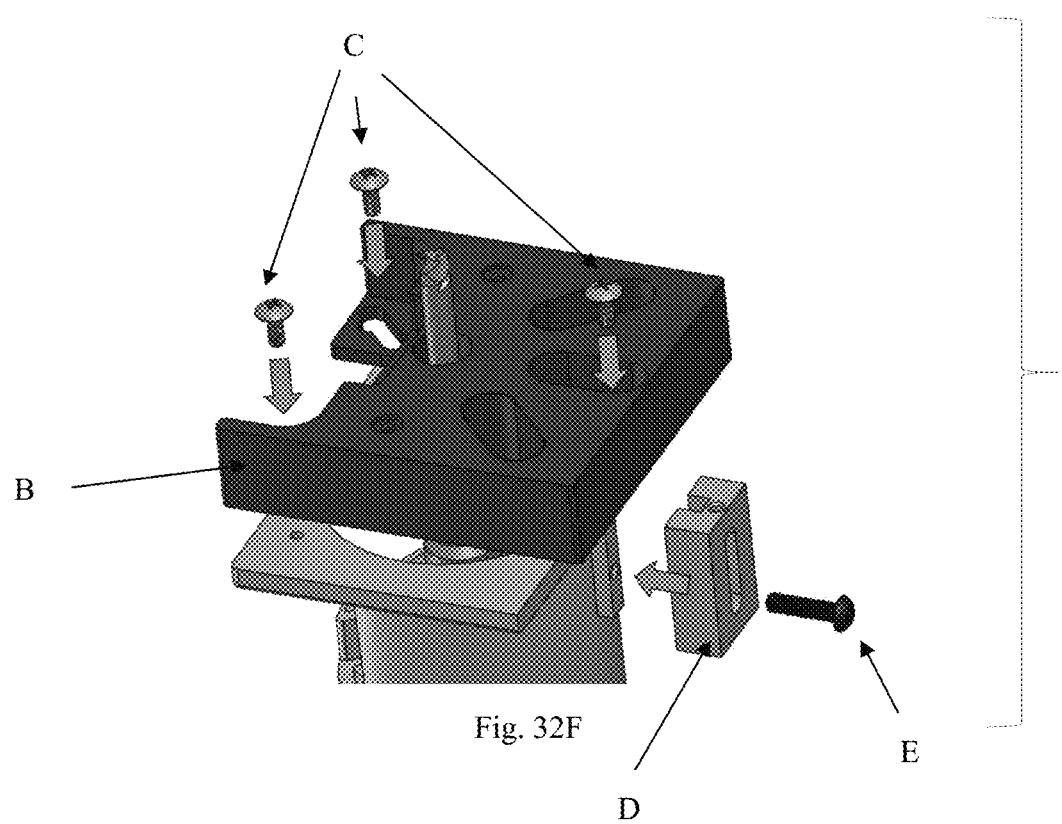
FIG. 32F depicts a step in a method router adapter installation according to one or more aspects of the disclosure.

FIG. 32F generally depicts a second Installation Method. Align Router Adapter (B) with 2 screw holes in front of router base, and loosely install (2) Router Adapter Screws (C). Loosely install Router Adapter Side Block (D) to accessory attachment hole o back of router with (1) Router Side Block Screw (E). Use the appropriate size for your router. Loosely install (1) Router Adapter Screw (E) into the Side Block (D) through the Router Adapter (B). Tighten (2) front Router Adapter Screws (E). Press Side Block (D) against router and tighten (1) Router Side Block Screw (E).

The foregoing has been a detailed description of illustrative embodiments of the invention. Various modifications and additions can be made without departing from the spirit and scope if this invention. Each of the various embodiments described above may be combined with other described embodiments in order to provide multiple features. As used herein the directional terms, such as, but not limited to, "up" and "down", "upward" and "downward", "rear", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity. Furthermore, while the foregoing describes a number of separate embodiments of the apparatus and method of the present invention, what has been described herein is merely illustrative of the application of the principles of the present invention. For example, the foregoing jig can be adapted to machining and finishing other parts for a firearm, such as portions of an upper receiver that is being repaired, modified or fabricated. Moreover, the jig can be sold as part of a kit with additional right and left carriages and guide pins that are adapted for machining other firearms (for example, polishing the internal surfaces or repairing a restored firearm). This jig can be adapted for firearms of various sizes and shapes by interchanging the carriages, thereby providing a jig that can be useful to a person finishing a firearm, and repairing and/or restoring a firearm. Also, it is expressly contemplated that the size and shape of the plates of the jig can vary. In general, they are sized in an embodiment proportionally to the depiction herein relative to the size of the lower receiver. Accordingly, this description is meant to be taken only by way of example, and not to otherwise limit the scope of this invention.

What is claimed is:

1. A jig for manufacturing a lower receiver from a blank having a buffer tube and a takedown pin hole comprising:
a rotary tool adapter;
a top plate configured to couple to the buffer tube by a buffer support assembly and to the takedown pin by a front support assembly;
first and second carriage plates coupled to the top plate and configured to extend on respective first and second sides of the lower receiver, the first and second carriage plates configured to be spaced from the lower receiver;
wherein the interaction of the top surface of the top plate and the rotary tool adapter is configured to align the rotary power tool with respect to the lower receiver for machining purposes.

2. The jig of claim 1, wherein the first and second carriage plates have a thickness of at least 1.0 inches.

3. The jig of claim 1, wherein a proximal end of each of the first and second carriage plates is coupled with the top plate and a distal end of each of the first and second carriage plates extends therefrom.

4. The jig of claim 3, wherein the distal ends of the first and second carriage plates are not coupled with each other by a cross bolt.

5. The jig of claim 3, wherein the distal ends of the first and second carriage plates extend below a lowermost point of the lower receiver.

6. The jig of claim 5, wherein the distal ends of the first and second carriage plates each comprise a pair of opposing notches.

7. The jig of claim 5, wherein the distal ends of the first and second carriage plates are configured to be clamped in a vice in a forward-rear orientation.

8. The jig of claim 1, wherein the buffer support assembly includes a buffer locator and a buffer support, the buffer locator configured to be inserted through buffer support and threaded into the lower receiver to secure buffer support to the lower receiver.

\* \* \* \* \*